US010857985B2

(12) United States Patent
Hattori et al.

(10) Patent No.: US 10,857,985 B2
(45) Date of Patent: Dec. 8, 2020

(54) ELECTROMAGNETIC VALVE AND BRAKE APPARATUS

(71) Applicant: HITACHI AUTOMOTIVE SYSTEMS, LTD., Hitachinaka (JP)

(72) Inventors: Takatoshi Hattori, Atsugi (JP); Katsuya Iwasaki, Isehara (JP); Toshihide Ikura, Atsugi (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 179 days.

(21) Appl. No.: 16/083,855

(22) PCT Filed: Sep. 5, 2016

(86) PCT No.: PCT/JP2016/075939
§ 371 (c)(1),
(2) Date: Sep. 10, 2018

(87) PCT Pub. No.: WO2017/158877
PCT Pub. Date: Sep. 21, 2017

(65) Prior Publication Data
US 2019/0061718 A1 Feb. 28, 2019

(30) Foreign Application Priority Data
Mar. 18, 2016 (JP) .................. 2016-054684

(51) Int. Cl.
*B60T 8/36* (2006.01)
*B60T 15/36* (2006.01)
(Continued)

(52) U.S. Cl.
CPC .............. *B60T 8/367* (2013.01); *B60T 7/042* (2013.01); *B60T 8/36* (2013.01); *B60T 13/146* (2013.01);
(Continued)

(58) Field of Classification Search
CPC .......... B60T 8/367; B60T 15/36; B60T 7/042; B60T 8/36; B60T 13/662; B60T 13/686;
(Continued)

(56) References Cited

U.S. PATENT DOCUMENTS 5,584,323 A 12/1996 Yamamuro
2003/0038536 A1* 2/2003 Cheong ................. B60T 8/5025
303/119.2

(Continued)

FOREIGN PATENT DOCUMENTS

JP 08-004937 A 1/1996
JP 5178653 4/2013

OTHER PUBLICATIONS

Translation of Japanese Patent No. 5178653 obtained from website: https://worldwide.espacenet.com on Apr. 27, 2020.*

*Primary Examiner* — Pamela Rodriguez
(74) *Attorney, Agent, or Firm* — Foley & Lardner LLP

(57) ABSTRACT

An electromagnetic valve including a solenoid to generate an electromagnetic force; a cylindrical member at least partially disposed in the solenoid and made from a non-magnetic material; a movable member configured to be moved in the cylindrical member in an axial direction of the valve based on the solenoid, the movable member including a restriction portion on one end side of the movable member; a plunger including one end portion located on the one end side and an opposite end portion located on an opposite end side of the movable member, the plunger being restricted in a movement thereof in a radial direction due to the opposite end portion disposed at the restriction portion. A movable amount of the movable member in the radial direction in the cylindrical member is less than a movable amount of the plunger in the radial direction relative to the restriction portion.

20 Claims, 18 Drawing Sheets

(51) Int. Cl.
*B60T 17/02* (2006.01)
*B60T 13/14* (2006.01)
*B60T 7/04* (2006.01)
*B60T 13/68* (2006.01)
*F16K 25/00* (2006.01)
*F16K 31/06* (2006.01)
*B60T 13/66* (2006.01)
*B60T 15/02* (2006.01)
*F16K 27/02* (2006.01)
*B60T 8/48* (2006.01)

(52) U.S. Cl.
CPC .......... *B60T 13/662* (2013.01); *B60T 13/686* (2013.01); *B60T 15/028* (2013.01); *B60T 15/36* (2013.01); *B60T 17/02* (2013.01); *F16K 25/005* (2013.01); *F16K 27/029* (2013.01); *F16K 31/0624* (2013.01); *F16K 31/0655* (2013.01); *F16K 31/0675* (2013.01); *F16K 31/0693* (2013.01); *B60T 8/368* (2013.01); *B60T 8/4872* (2013.01)

(58) Field of Classification Search
CPC ........ B60T 15/028; B60T 17/02; B60T 8/368; B60T 8/4872; B60T 13/146; F16K 27/029; F16K 31/0624; F16K 31/0675; F16K 25/005; F16K 31/0655; F16K 31/0693
USPC ......... 303/119.1, 119.2, 114.1, 115.2, 119.3; 251/30.01–30.05
See application file for complete search history.

(56) References Cited

U.S. PATENT DOCUMENTS

2012/0153199 A1  6/2012  Nguyen
2018/0251108 A1* 9/2018  Yamaguchi ............... B60T 8/36
2019/0248353 A1* 8/2019  Kratzer .................... B60T 8/32

* cited by examiner (a)

(b)

(a)

(b)

(a)

(b)

ELECTROMAGNETIC VALVE AND BRAKE APPARATUS

TECHNICAL FIELD

The present invention relates to an electromagnetic valve and a brake apparatus.

BACKGROUND ART

As this kind of technique, there is disclosed a technique discussed in the following patent literature, PTL 1. PTL 1 discloses a technique that defines a relationship between a radial space between a cylinder and an armature of an electromagnetic valve, a radial space between the armature and a plunger, and a radial space between the plunger and a body, thereby prohibiting the armature from having surface contact with the cylinder and thus preventing or reducing sliding resistance.

CITATION LIST

Patent Literature

PTL 1: Japanese Patent No. 5178653

SUMMARY OF INVENTION

Technical Problem

In the technique disclosed in the above-described patent literature, PTL 1, when the armature is rotated (tilted) in the cylinder, a portion of the plunger that is contained in a recessed portion formed by piercing the armature is brought into abutment with an inner peripheral surface of the recessed portion at two portions, which restricts an amount of the rotation of the armature. According thereto, the plunger is subjected to a force from the armature in a direction that rotates the plunger. As a result, friction may increase between a distal end of the plunger and a valve seat onto which the plunger is seated when the valve is closed.

The present invention has been made in consideration of the above-described problem, and an object thereof is to provide an electromagnetic valve and a brake apparatus capable of reducing the friction between the plunger and the valve seat.

Solution to Problem

To achieve the above-described object, according to a first embodiment of the present invention, an electromagnetic valve includes a solenoid configured to generate an electromagnetic force by receiving power supply, a cylindrical member disposed at an inner periphery of the solenoid and made from a non-magnetic material, a movable member including a restriction portion on one end side in an axial direction, configured to be moved in the axial direction on an inner periphery of the cylindrical member due to an attracting force of the solenoid, and made from a magnetic material, and a plunger configured to be subjected to restriction of a movement thereof in a radial direction due to an opposite end portion thereof disposed at the restriction portion. when CLa represents a movable amount of the movable member in the radial direction on the inner peripheral side of the cylindrical member, and CLb represents a movable amount of the plunger in the radial direction relative to the restriction portion, an expression CLa<CLb is satisfied.

According to a second aspect of the present invention, an electromagnetic valve includes a solenoid configured to generate an electromagnetic force by receiving power supply, a cylindrical member disposed at an inner periphery of the solenoid and made from a non-magnetic material, a movable member including a recessed portion formed on a surface on one end side in an axial direction and opened toward the one end side in the axial direction, configured to be moved in the axial direction on the inner periphery of the cylindrical member due to an attracting force of the solenoid, and made from a magnetic material, and a plunger including an opposite end portion in the axial direction that is disposed in the recessed portion. when CLa represents a maximum radial space between an outer periphery of the movable member and an inner periphery of the cylindrical member, and CLb represents a minimum radial space between an outer periphery of the plunger and an inner periphery of the recessed portion, an expression CLa<CLb is satisfied.

According to a third aspect of the present invention, a brake apparatus includes an electromagnetic valve provided in a housing and configured to open and close a fluid passage according to an operation state of a brake. The electromagnetic valve includes a solenoid configured to generate an electromagnetic force by receiving power supply, a cylindrical member disposed at an inner periphery of the solenoid and made from a non-magnetic material, a movable member including a restriction portion on one end side in an axial direction, configured to be moved in the axial direction on an inner periphery of the cylindrical member due to an attracting force of the solenoid, and made from a magnetic material, and a plunger configured to be subjected to restriction of a movement thereof in a radial direction due to one end portion thereof disposed at the restriction portion. When CLa represents a movable amount of the movable member in the radial direction on the inner peripheral side of the cylindrical member, and CLb represents a movable amount of the plunger in the radial direction relative to the restriction portion, an expression CLa<CLb is satisfied.

Therefore, the present invention can reduce the friction between the plunger and the valve seat.

DESCRIPTION OF EMBODIMENTS

First Embodiment

[Configuration of Brake Hydraulic Circuit]

Figure 1:
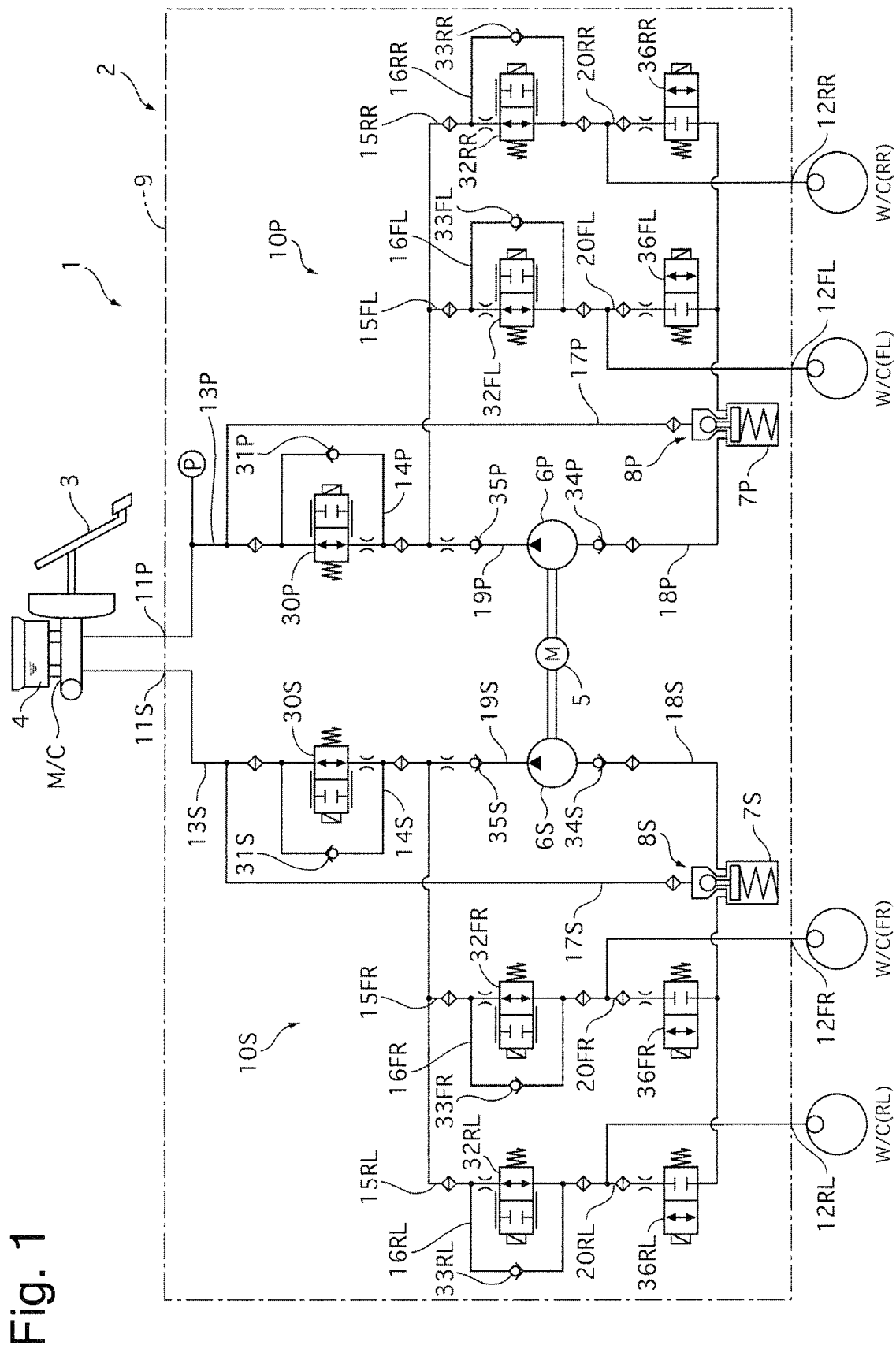
FIG. 1 illustrates a hydraulic circuit of a brake apparatus according to a first embodiment.
Figure 2:
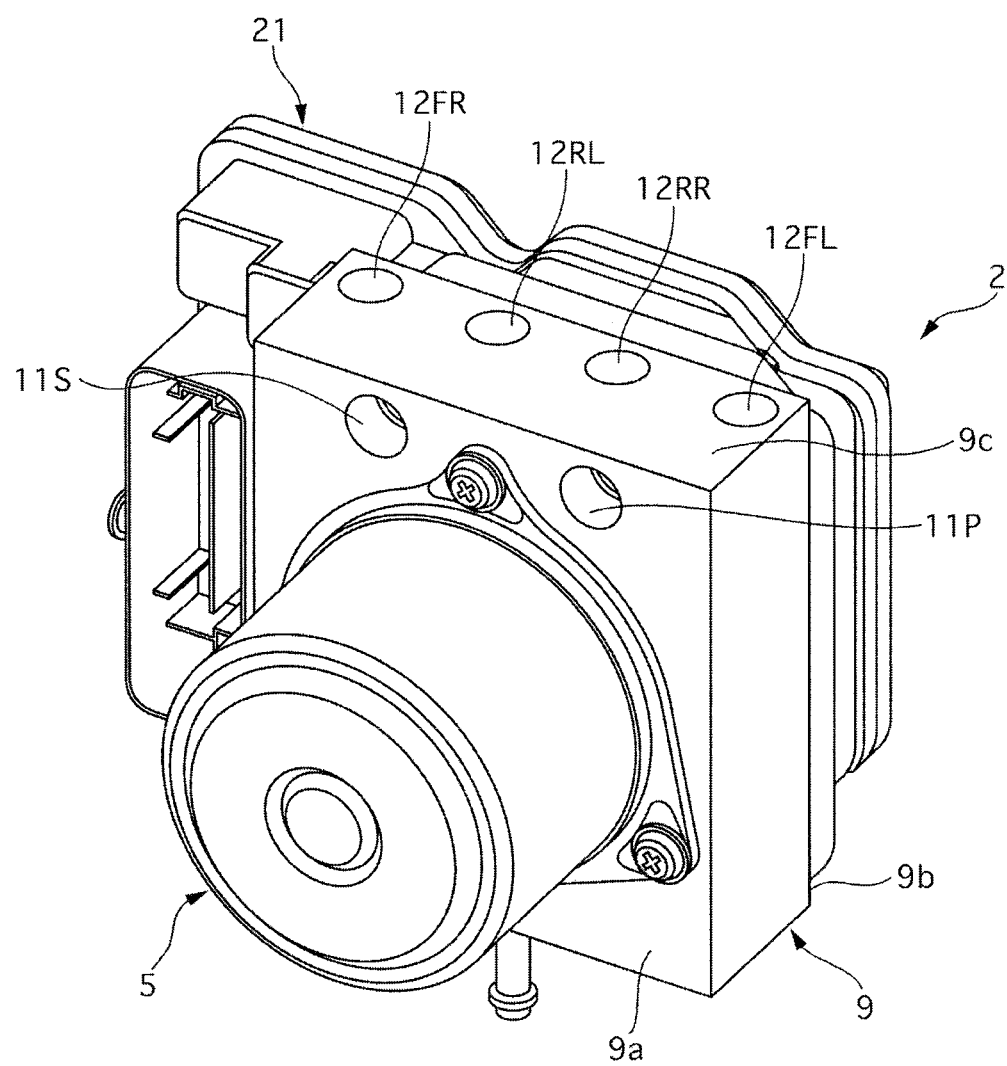
FIG. 2 is a perspective view of a hydraulic control unit according to the first embodiment.

FIG. 1 illustrates a hydraulic circuit of a brake apparatus 1 according to a first embodiment. The brake apparatus 1 according to the first embodiment includes ten valves in the hydraulic circuit. The hydraulic circuit is formed in a housing 9 of a hydraulic control unit 2 provided between a master cylinder M/C and wheel cylinders W/C. The housing 9 is formed generally cuboidally (FIG. 2). The housing 9 is carved out of an aluminum block. The housing 9 is pierced to form a plurality of fluid passages and the like therein, and includes each of electromagnetic valves, a pump unit, and a motor, which will be described below.

In the brake apparatus 1, a brake pedal 3 is operated by a driver, and the master cylinder M/C supplies brake fluid in a reservoir tank 4 to the wheel cylinders W/C. Further, in the brake apparatus 1, pumps 6P and 6S, which are driven by a motor 5, introduce therein the brake fluid in the reservoir tank 4, and supply the brake fluid to the wheel cylinders W/C.

This brake apparatus 1 performs hydraulic control according to a hydraulic pressure requested by control of a behavior of a vehicle from a controller, an anti-lock brake system, a brake assist, or the like.

The brake apparatus 1 has an X-type dual circuit structure including two systems, i.e., a brake hydraulic circuit 10P of a P system connecting the master cylinder M/C and a wheel cylinder W/CFL for a front left wheel and a wheel cylinder W/CRR for a rear right wheel, and a brake hydraulic circuit 10S of an S system connecting the master cylinder M/C and a wheel cylinder W/CFR for a front right wheel and a wheel cylinder W/CRL for a rear left wheel.

Hereinafter, "P" and "S" will be added to reference numerals of components provided in the P system and reference numerals of components provided in the S system, respectively, but will be omitted when the components do not have to be especially defined about which system they belong to in the context. Similarly, "FL", "FR", "RL", and "RR" will be added to reference numerals of components provided in correspondence with the front left wheel, the front right wheel, the rear left wheel, and the rear right wheel, respectively, but will be omitted when the components do not have to be especially defined as to which wheel they are associated with in the context.

The master cylinder M/C is connected to the housing 9 at master cylinder ports 11P and 11S. The individual wheel cylinders W/C are connected to the housing 9 at wheel cylinder ports 12FL, 12FR, 12RL, and 12RR, respectively.

Fluid passages 13P and 13S are connected to the master cylinder ports 11P and 11S, respectively. Gate-out valves 30P and 30S, which are normally-opened proportional control valves, are provided in the fluid passages 13P and 13S, respectively. One-way valves 31P and 31S are respectively provided in fluid passages 14P and 14S, which bypass the gate-out valves 30. These one-way valves 31 are configured to be opened for a flow of the brake fluid from the master cylinder M/C side and closed for a flow in an opposite direction.

The fluid passages 13 and the individual wheel cylinders W/C are connected to each other via fluid passages 15FL, 15FR, 15RL, and 15RR, respectively. Pressure increase valves 32FL, 32FR, 32RL, and 32RR, which are normally-opened proportional control valves, are provided in the fluid passages 15, respectively. One-way valves 33FL, 33FR, 33RL, and 33RR are respectively provided in fluid passages 16FL, 16FR, 16RL, and 16RR, which bypass the individual pressure increase valves 32. These one-way valves 33 are configured to be opened for a flow of the brake fluid traveling from the wheel cylinders M/C toward the fluid passages 13 and closed fora flow in an opposite direction.

The fluid passages 13 and reservoirs 7P and 7S are connected to each other via fluid passages 17P and 17S, respectively. The fluid passages 17 are connected to the fluid passages 13 between the master cylinder ports 11 of the fluid passages 13 and the gate-out valves 30. Check valves 8P and 8S are provided at portions where the reservoirs 7 and the fluid passages 17 are connected to each other, respectively.

The reservoirs 7 and intake sides of the pumps 6P and 6S are connected to each other via fluid passages 18P and 18S, respectively. One-way valves 34P and 34S are provided in the fluid passages 18, respectively. The one-way valves 34 are configured to be opened for a flow of the brake fluid traveling from the reservoirs 7 toward the pumps 6 and closed for a flow in an opposite direction.

Discharge sides of the pumps 6 and the fluid passages 13 are connected to each other via fluid passages 19P and 19S, respectively. One-way valves 35P and 35S are provided in the fluid passages 19, respectively. The one-way valves 35 are configured to be opened for a flow of the brake fluid traveling from the pumps 6 toward the fluid passages 13 and closed for a flow in an opposite direction.

The individual wheel cylinders W/C and the reservoirs 7 are connected to each other via fluid passages 20FL, 20FR, 20RL, and 20RR, respectively. Pressure reduction valves 36FL, 36FR, 36RL, and 36RR, which are normally-closed ON/OFF valves, are provided in the fluid passages 20, respectively.

[Configuration of Housing]

Figure 3:
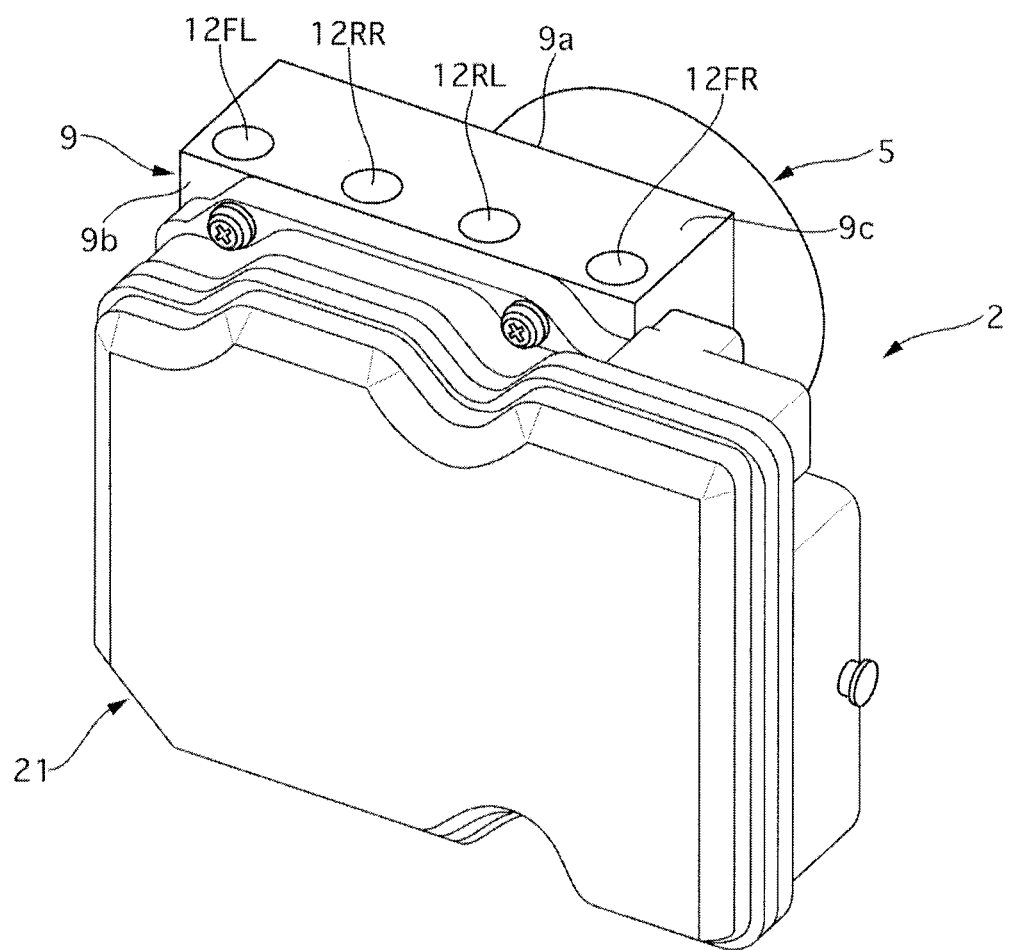
FIG. 3 is a perspective view of the hydraulic control unit according to the first embodiment.
Figure 4:
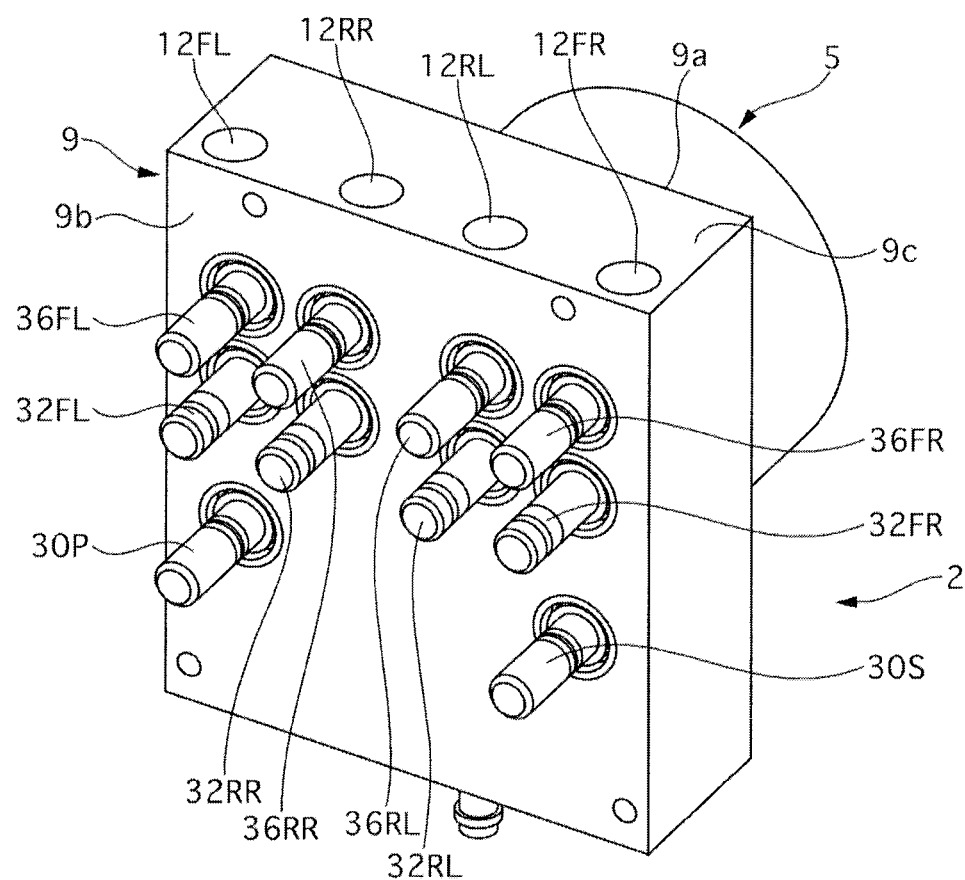
FIG. 4 is a perspective view of the hydraulic control unit according to the first embodiment.

FIG. 2 is a perspective view of the hydraulic control unit 2. FIG. 3 is a perspective view of the hydraulic control unit 2. FIG. 4 is a perspective view of the hydraulic control unit 2. FIG. 4 illustrates the hydraulic control unit 2 with an electronic control unit 21 removed therefrom.

The housing 9 is made from aluminum and formed generally cuboidally. The motor 5 is attached on a first surface 9a of six surfaces of the housing 9. An attachment hole, in which each of the electromagnetic valves 30, 32, and 36 is attached, is formed on a second surface 9b opposite from the first surface 9a. Further, the electronic control unit 21 is attached on the second surface 9b. The electronic control unit 21 controls each of the electromagnetic valves 30, 32, and 36, and the motor 5.

The wheel cylinder ports 12FL, 12FR, 12RL, and 12RR are opened on a third surface 9c, which is a surface connecting the first surface 9a and the second surface 9b and serving as a top surface when the hydraulic control unit 2 is placed as illustrated in FIG. 2. The master cylinder pots 11P and 11S are opened on the first surface 9a on the third surface 9c side with respect to the motor 5.

[Configuration of Gate-Out Valve]

Figure 5:
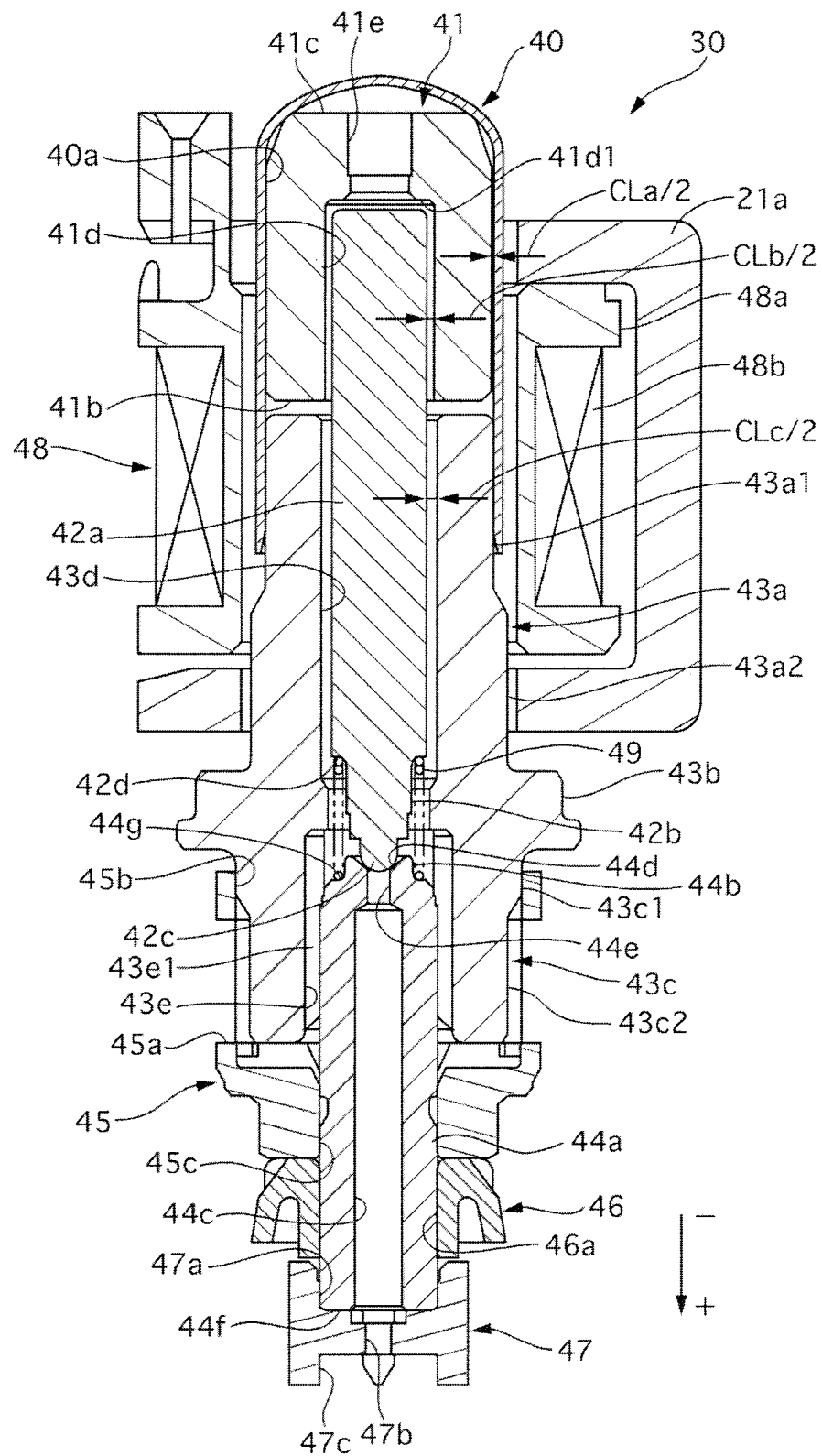
FIG. 5 is an axial cross-sectional view of a gate-out valve according to the first embodiment.
Figure 6:
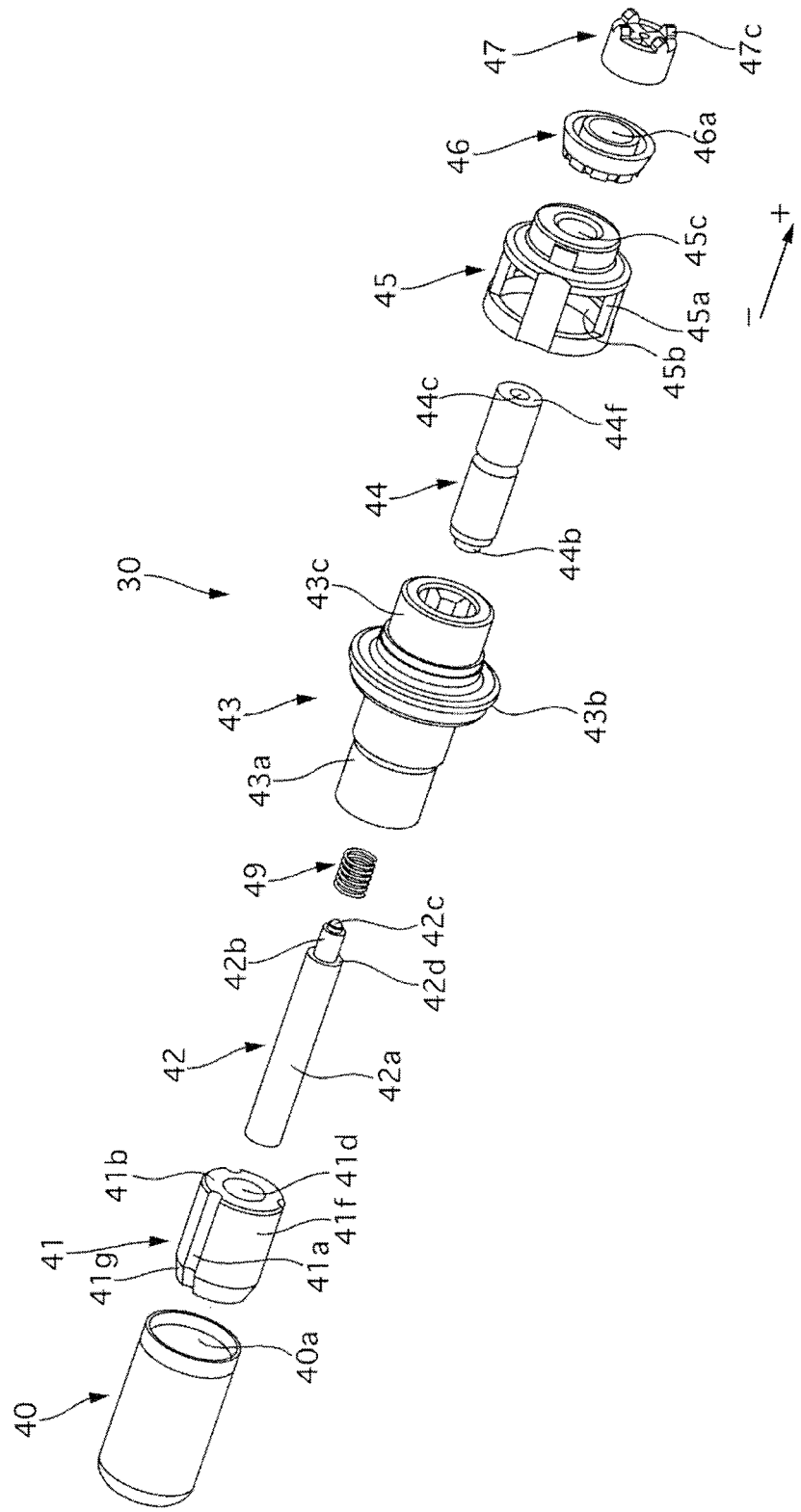
FIG. 6 is an exploded perspective view of the gate-out valve according to the first embodiment.
Figure 7:
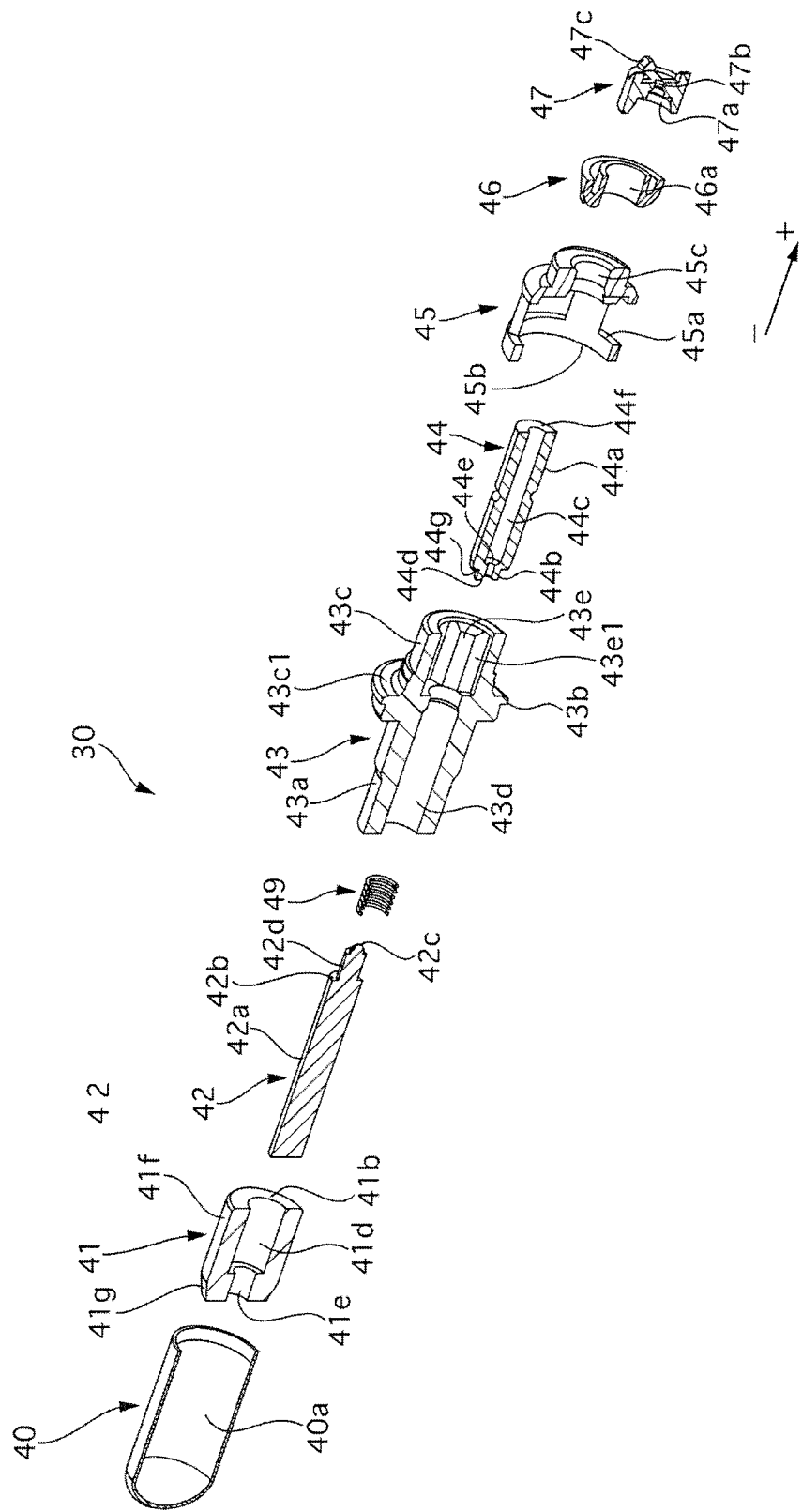
FIG. 7 is an exploded perspective view of the gate-out valve according to the first embodiment.

FIG. 5 is an axial cross-sectional view of the gate-out valve 30. FIG. 6 is an exploded perspective view of the gate-out valve 30. FIG. 7 is an exploded perspective view (a cross-sectional view) of the gate-out valve 30. FIG. 5 illustrates the gate-out valve 30 with central axes of an armature 41 and a plunger 42 coinciding with a central axis of an insertion hole 43d of a body 43. Hereinafter, the central axes of the armature 41, the plunger 42, and the insertion hole 43d of the body 43 in the state illustrated in FIG. 5 will be referred to as a "valve axis". FIG. 5 illustrates the gate-out valve 30 in an opened state. Hereinafter, a downward direction and an upward direction in FIG. 5 will be defined to be a positive direction and a negative direction, respectively.

The gate-out valve 30 includes a cylinder 40, the armature 41, the plunger 42, the body 43, a seat member 44, a first filter member 45, a seal 46, a second filter member 47, and a solenoid 48.

The cylinder 40 is formed into a cylindrical shape extending in an axial direction. An inner periphery of the cylinder 40 forms an armature containing portion 40a. A positive side and a negative side of the cylinder 40 in the axial direction are opened and closed, respectively. The cylinder 40 is made from a non-magnetic member.

Figure 8:
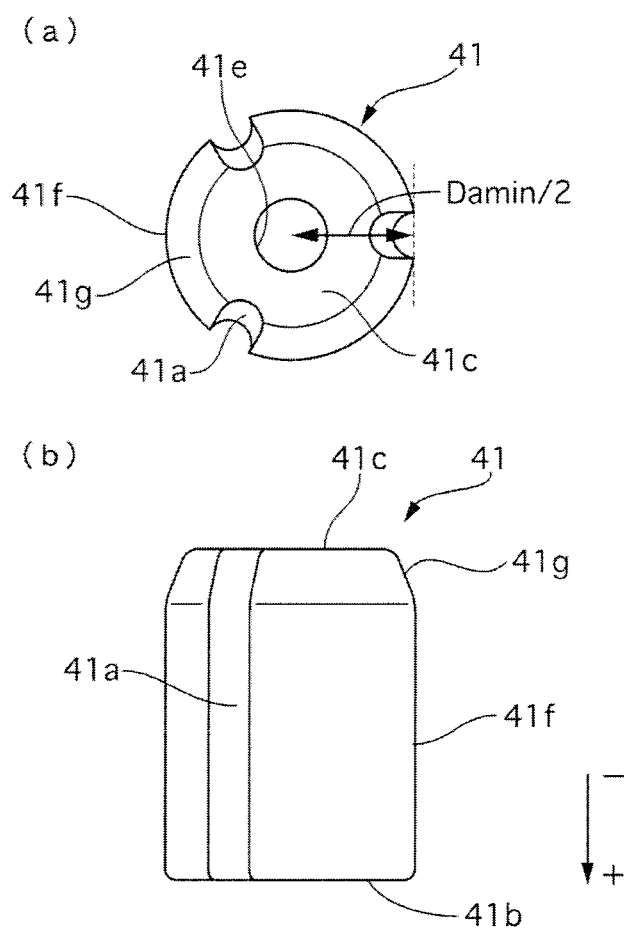
FIG. 8 illustrates an outer appearance of an armature according to the first embodiment.
Figure 9:
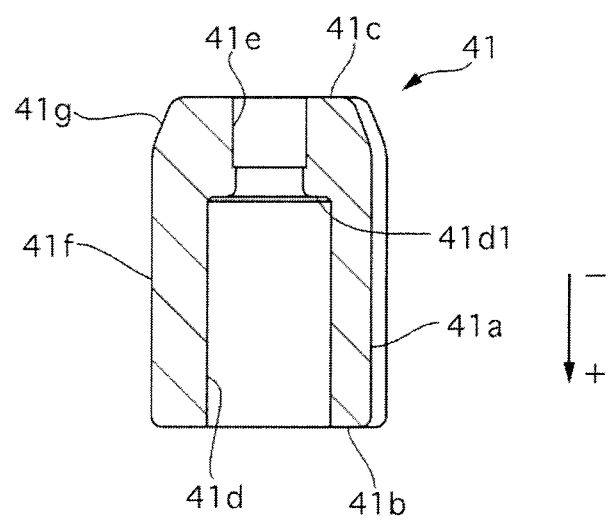
FIG. 9 is an axial cross-sectional view of the armature according to the first embodiment.

The armature 41 is provided movably in the axial direction inside the cylinder 40. The armature 41 is made from a magnetic material. FIG. 8 illustrates an outer appearance of the armature 41. FIG. 8(a) illustrates the armature 41 as viewed from the negative side in the axial direction. FIG. 8(b) illustrates the armature 41 as viewed from a radial direction. FIG. 9 is an axial cross-sectional view of the armature 41.

The outer appearance of the armature 41 is generally columnar. A positive side of the armature 41 in the axial direction forms a main body portion 41f. A tapered portion 41g is formed on an outer peripheral surface on the negative side in the axial direction with respect to the main body portion 41f. The tapered portion 41g has an outer diameter reducing toward the negative side in the axial direction. Three communication grooves 41a are formed on an outer peripheral surface of the armature 41. The communication grooves 41a are formed into recessed shapes relative to the other portion of the outer periphery of the armature 41. The communication grooves 41a are formed at approximately equal distances in a circumferential direction of the outer peripheral surface of the armature 41 when the armature 41 is viewed from the axial direction. The communication grooves 41a are formed across from a first surface 41b, which is a surface of the armature 41 on the positive side in the axial direction, to a second surface 41c, which is a surface of the armature 41 on the negative side in the axial direction.

The armature 41 is pierced to form a restriction portion 41d on the first surface 41b. The restriction portion 41d is formed as a recessed portion circular in cross section viewed from the axial direction in which the restriction portion 41d is opened on the first surface 41b. A part of the plunger 42, which will be described below, is inserted in the restriction portion 41d. A communication hole 41e is formed on the armature 41. The communication hole 41e establishes communication between a bottom portion 41d1 of the restriction portion 41d on the negative side in the axial direction and the second surface 41c. An inner diameter of the communication hole 41e is smaller than an inner diameter of the restriction portion 41d.

Figure 10:
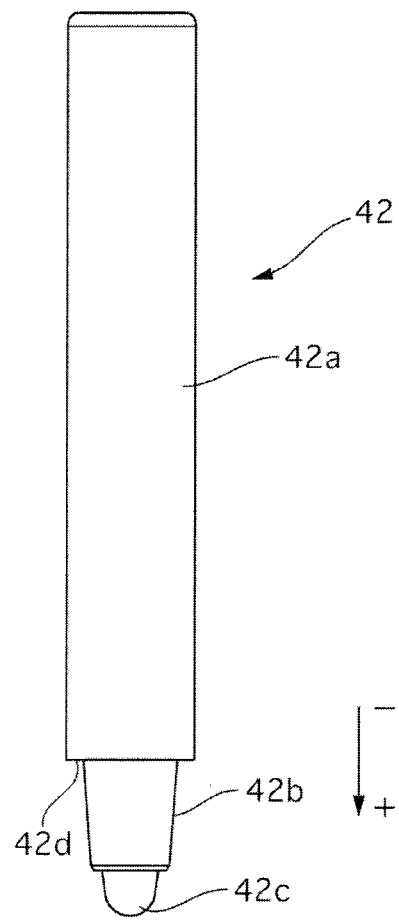
FIG. 10 illustrates an outer appearance of a plunger according to the first embodiment.
Figure 10:
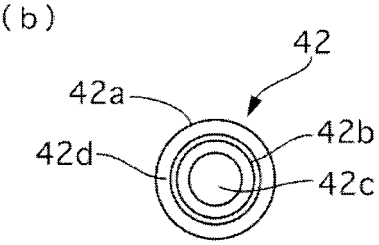

The plunger 42 is formed into a rod shape extending in the axial direction. The plunger 42 is made from resin. FIG. 10 illustrates an outer appearance of the plunger 42. FIG. 10(a) illustrates the plunger 42 as viewed from the radial direction. FIG. 10(b) illustrates the plunger 42 as viewed from the negative side in the axial direction.

The plunger 42 includes a main body portion 42a, a tapered portion 42b, a valve body 42c, and a spring abutment portion 42d. The main body portion 42a accounts for most of the plunger 42, and is formed generally cylindrically. A negative side of the main body portion 42a in the axial direction is inserted in the restriction portion 41d of the armature 41 (FIG. 5). A space is provided between an outer peripheral surface of the main body portion 42a and an outer peripheral surface of the restriction portion 41d. Therefore, although the plunger 42 is moved in the radial direction with respect to the valve axis, a movement amount thereof is restricted by the restriction portion 41d.

The tapered portion 42b is formed on a positive side of the main body portion 42a in the axial direction. An outer diameter of a negative side of the tapered portion 42b in the axial direction is smaller than an outer diameter of the main body portion 42a. The outer diameter of the tapered portion 42b gradually reduces from the negative side toward the positive side in the axial direction. A flat surface generally perpendicular to the axial direction is formed between an end of the main body portion 42a on the positive side in the axial direction and an end of the tapered portion 42b on the negative side in the axial direction, and this flat surface forms the spring abutment portion 42d. The valve body 42c is formed at a distal end of the tapered portion 42b on the positive side in the axial direction. A positive side of the valve body 42c in the axial direction is spherically formed.

The body 43 includes a first cylindrical portion 43a, a flange portion 43b, and a second cylindrical portion 43c in this order from the negative side in the axial direction. A small-diameter portion 43a1 is formed on a negative side of the first cylindrical portion 43a in the axial direction. A large-diameter portion 43a2 is formed on a positive side of the first cylindrical portion 43a in the axial direction. An outer diameter of the small-diameter portion 43a1 is smaller than an outer diameter of the large-diameter portion 43a2. A part of the small-diameter portion 43a1 is inserted in the cylinder 40, and is welded from an outer periphery of the cylinder 40.

An outer diameter of the flange portion 43b is larger than an outer diameter of the other portion of the body 43. The flange portion 43b is swaged by a body of the housing 9, by which the gate-out valve 30 is fixed to the housing 9.

A large-diameter portion 43c1 is formed on a negative side of the second cylindrical portion 43c in the axial direction. A small-diameter portion 43c2 is formed on a positive side of the second cylindrical portion 43c in the axial direction. An outer diameter of the large-diameter portion 43c1 is larger than an outer diameter of the small-diameter portion 43c2.

An insertion hole 43d is formed at a portion of the body 43 in the axial direction where the first cylindrical portion 43a is formed. An inner diameter of the insertion hole 43d is larger than the outer diameter of the main body portion 42a of the plunger 42. The plunger 42 is provided movably in the axial direction in the insertion hole 43d.

A through-hole 43e is formed at a portion of the body 43 in the axial direction where the flange portion 43b and the second cylindrical portion 43c are formed. An inner diameter of the through-hole 43e is larger than the inner diameter of the insertion hole 43d. A plurality of axial grooves 43e1 extending in the axial direction is formed on an inner peripheral surface of the through-hole 43e. The axial grooves 43e1 are formed evenly in a circumferential direction of an inner periphery of the through-hole 43e.

The seat member 44 is formed into a cylindrical shape extending in the axial direction. The seat member 44 includes a main body portion 44a and a spring insertion portion 44b. The main body portion 44a accounts for most of the seat member 44, and is formed generally cylindrically. The spring insertion portion 44b is formed on a negative side of the main body portion 44a in the axial direction. An outer diameter of the spring insertion portion 44b is smaller than an outer periphery of the main body portion 44a. A flat surface generally perpendicular to the axial direction is formed between an end of the main body portion 44a on the negative side in the axial direction and an end of the spring insertion portion 44b on the positive side in the axial direction, and this flat surface forms a spring abutment portion 44g.

A seat 44d is formed on a negative side of the seat member 44 in the axial direction. The seat 44d is formed by forming a spherical impression at a center of a conical recess. When the gate-out valve 30 is closed, the valve body 42c of the plunger 42 is seated on the seat 44d. An orifice 44e is opened on a bottom portion of the seat 44d. A through-hole 44c is formed on the positive side in the axial direction with respect to the orifice 44e. The through-hole 44c and the orifice 44e are in communication with each other. A positive side of the through-hole 44c in the axial direction is opened on an end surface 44f of the seat member 44 on the positive side in the axial direction.

The first filter member 45 is made from resin and formed into a cap-like shape. A plurality of windows 45a is formed on a side surface of the first filter member 45. A mesh-like filter is attached on each of the windows 45a. The second cylindrical portion 43c (the large-diameter portion 43c1) of the body 43 is inserted in an opening portion 45b on a negative side of the first filter member 45 in the axial direction. A through-hole 45c is formed on a bottom surface of the first filter member 45. The seat member 44 is inserted through the through-hole 45c.

The seal 46 is made from resin. A through-hole 46a penetrating through in the axial direction is formed in the seal 46. The seat member 44 is inserted through the through-hole 46a.

The second filter member 47 is made from resin. A recessed portion 47a is formed on a negative side of the second filter member 47 in the axial direction. The recessed portion 47a has an inner diameter approximately equal to an outer diameter of an end of the seat member 44 on the positive side in the axial direction. The end of the seat member 44 on the negative side in the axial direction is inserted in the recessed portion 47a. A through-hole 47b is formed from a bottom portion of the recessed portion 47a to a negative side thereof in the axial direction. A mesh-like filter is attached to the through-hole 47b. A plurality of legs 47c protrudes toward the positive side in the axial direction on a negative side of the second filter member 47 in the axial direction.

The solenoid 48 is formed so as to overlap the armature 41 and the body 43 in the axial direction on an outer peripheral side of the gate-out valve 30. The solenoid 48 is formed by winding a coil 48b around a bobbin 48a. The solenoid 48 is held by a yoke 21a of the electronic control unit 21.

A coil spring 49 is set in a compressed manner between the spring abutment portion 42d of the plunger 42 and the spring abutment portion 44g of the seat member 44. The plunger 42 is biased by the coil spring 49 in a direction that causes the valve body 42c to be moved away from the seat 44d.

[Management of Radial Space]

A space between the cylinder 40 and the armature 41 is managed in the following manner.

Assume that a maximum inner diameter $D1max$ is a diameter twice as long as a distance from a farthest point from a center of an inner peripheral surface of the armature containing portion 40a to the center, when the armature containing portion 40a of the cylinder 40 is viewed from the axial direction. Assume that a minimum outer diameter $D2min$ is a diameter twice as long as a distance from a closest point to a center of the outer peripheral surface of the armature 41 to the center, when the main body portion 41f of the armature 41 is viewed from the axial direction. Assume that an outer peripheral surface of a portion of the armature 41 where the communication groove 41a is located is a straight line connecting ends of the communication groove 41a in the circumferential direction (refer to FIG. 8(a)). Here, a maximum radial space CLa between the inner periphery of the armature containing portion 40a of the cylinder 40 and the outer periphery of the main body portion 41f of the armature 41 is defined to be $CLa=D1max-D2min$.

Assume that a minimum inner diameter $D2min$ is a diameter twice as long as a distance from a closest point to a center of the inner peripheral surface of the restriction portion 41d to the center, when the restriction portion 41d of the armature 41 is viewed from the axial direction. Assume that a maximum outer diameter $D3max$ is a diameter twice as long as a distance from a farthest point to a center of the outer peripheral surface of the main body portion 42a to the center, when the main body portion 42a of the plunger 42 is viewed from the axial direction. Here, a minimum radial space CLb between the inner periphery of the restriction portion 41d of the armature 41 and the outer periphery of the main body portion 42a of the plunger 42 is defined to be $CLb=D2min-D3max$.

Assume that a minimum inner diameter $D4min$ is a diameter twice as long as a distance from a closest point to a center of an inner peripheral surface of the insertion hole 43d to the center, when the insertion hole 43d of the body 43 is viewed from the axial direction. Here, a minimum radial space CLc between the inner periphery of the insertion hole 43d of the body 43 and the outer periphery of the main body portion 42a of the plunger 42 is defined to be $CLc=D4min-D3max$.

A relationship between the maximum radial space CLa, the minimum radial space CLb, and the minimum radial space CLc is set so as to satisfy the following expression, when they are defined in the above-described manner.

$$CLa<CLb<CLc \text{ and } (CLa+CLb)<CLc$$

The maximum radial space CLa can also be restated as an amount CLa by which the armature 41 is movable in the radial direction relative to the armature containing portion 40a of the cylinder 40. The minimum radial space CLb can also be restated as an amount CLb by which the plunger 42 is movable in the radial direction relative to the restriction portion 41*d* of the armature 41. The minimum radial space CLc can also be restated as an amount CLc by which the plunger 42 is movable in the radial direction relative to the insertion hole 43*d* of the body 43.

[Operation of Gate-Out Valve]

When power is not supplied to the coil 48*b*, the plunger 42 is biased by the coil spring 49 in the direction that causes the valve body 42*c* to be moved away from the seat 44*d*. As a result, a space is generated between the valve body 42*c* and the seat 44*d*, so that hydraulic fluid flowing in from outside the first filter member 45 flows outward via the windows 45*a*, the axial grooves 43*e*1 of the body 43, the orifice 44*e* of the seat member 44, the through-hole 44*c*, and the second filter member 47. The hydraulic fluid flowing in from outside the second filter member 47 is transmitted in an opposite direction from the above-described route.

When power is supplied to the coil 48*b*, a magnetic path is formed in the armature 41, the body 43, and the yoke 21*a*. An attracting force is generated between the surface of the armature 41 on the positive side in the axial direction (the first surface 41*b*) and the surface of the body 43 on the negative side in the axial direction. Due to this attracting force, the armature 41 is moved to the positive side in the axial direction. According thereto, the plunger 42 is also moved to the positive side in the axial direction against the biasing force of the coil spring 49. When the valve body 42*c* at the distal end of the plunger 42 contacts the seat 44*d* of the seat member 44 over an entire circumference, the orifice 44*e* is closed. As a result, a flow passage between outside the first filter member 45 and outside the second filter member 47 is blocked.

The gate-out valve 30 is a proportional control valve, and an amount of power supply to the coil 48*b* is controlled by PWM control. By this control, the attracting force of the armature 41 can be proportionally controlled, and therefore the space (a cross-sectional area of the flow passage) between the valve body 42*c* and the seat 44*d* can be controlled. In other words, the gate-out valve 30 can control a desired flow amount (a hydraulic difference between an inflow side and an outflow side) of the hydraulic fluid.

[Regarding Valve-Opening Amount of Gate-Out Valve with Respect to Amount of Power Supply to Coil]

The gate-out valve 30 according to the first embodiment is a proportional valve, and a valve-opening amount thereof should be controlled. The valve-opening amount of the gate-out valve 30 is controlled by the amount of power supply to the coil 48*b*. However, in reality, a change occurs in friction applied in a direction that impedes the sliding movements of the armature 41 and the plunger 42, so that the gate-out valve 30 cannot be opened by a constant amount with respect to the amount of power supply to the coil 48*b*. The change in the friction applied to the armature 41 and the plunger 42 should be reduced to eliminate or reduce the variation in the valve-opening amount of the gate-out valve 30 with respect to the amount of power supply to the coil 48*b*.

In the first embodiment, the gate-out valve 30 is configured to eliminate or reduce the variation in the valve-opening amount of the gate-out valve 30 with respect to the amount of power supply of the coil 48*b* by especially reducing friction between the valve body 42*c* of the plunger 42 and the seat 44*d*.

[Regarding Friction Between Valve Body and Seat]

The spaces are provided in the radial direction with respect to the valve axis between the armature 41 and the cylinder 40, between the restriction portion 41*d* of the armature 41 and the plunger 42, and between the body 43 and the plunger 42. Therefore, the armature 41 and the plunger 42 are moved in the radial direction with respect to the valve axis.

Figure 11:
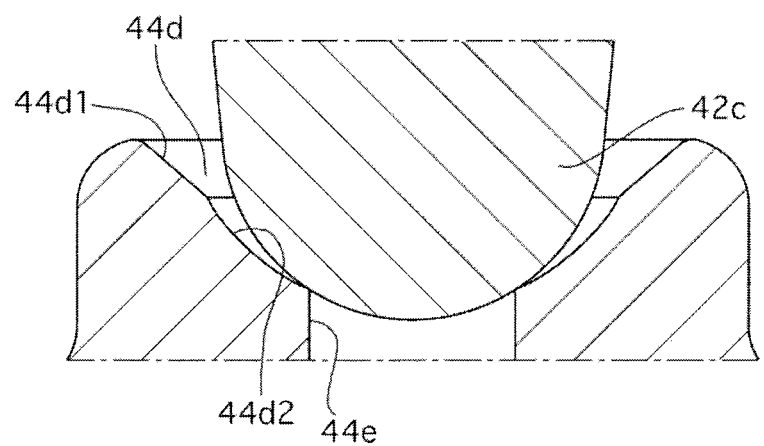
FIG. 11 is an enlarged view of a valve body and a seat of the gate-out valve according to the first embodiment.
Figure 11:
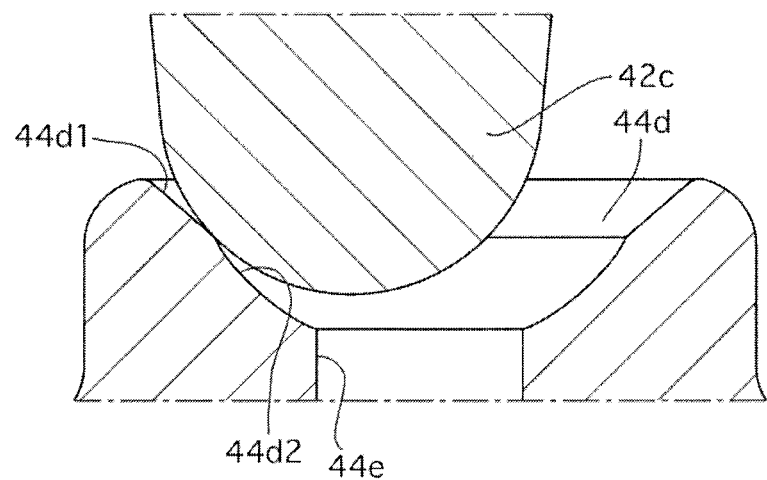

When the gate-out valve 30 is in such a state that the plunger 42 is moved in the radial direction, the valve body 42*c* of the plunger 42 and the seat 44*d* have a positional relationship that will be described now. FIG. 11 is an enlarged view illustrating the valve body 42*c* and the seat 44*d* of the gate-out valve 30. FIG. 11(*a*) illustrates the valve body 42*c* and the seat 44*d* with the gate-out valve 30 closed. FIG. 11(*b*) illustrates the valve body 42*c* and the seat 44*d* when the valve-opening amount of the gate-out valve 30 is proportionally controlled. The seat 44*d* is formed by forming the spherical impression at the center of the conical recess. Therefore, the seat 44*d* includes a conical portion 44*d*1 and a spherical portion 44*d*2.

When the gate-out valve 30 is closed with the plunger 42 moved in the radial direction, the valve body 42*c* is guided by the spherical portion 44*d*2 of the seat 44*d*, and the valve body 42*c* is located approximately on the valve axis. When the valve body 42*c* is moved in the valve-opening direction with the plunger 42 moved in the radial direction, the valve body 42*c* is moved while being in contact with side surfaces of the spherical portion 44*d*2 and the conical portion 44*d*1.

Figure 12:
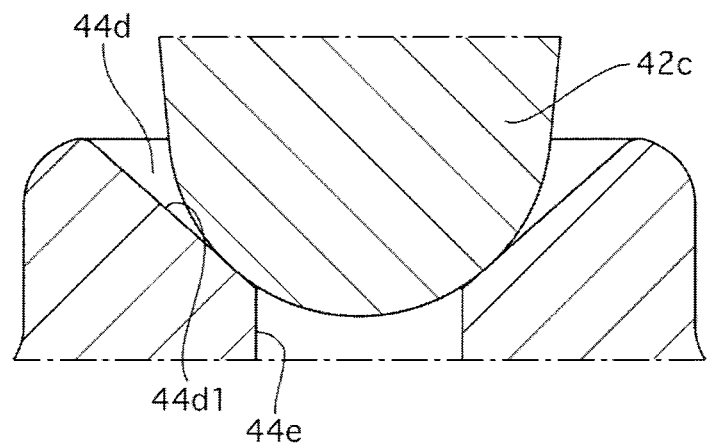
FIG. 12 is an enlarged view of the valve body and the seat of the gate-out valve according to the first embodiment.
Figure 12:
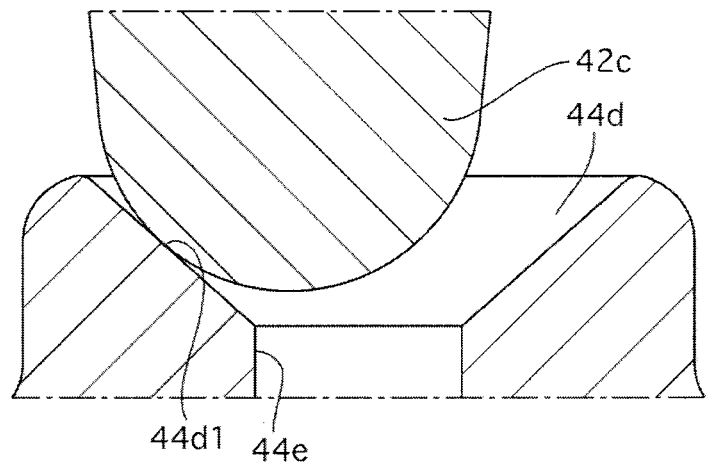

FIG. 12 is also an enlarged view illustrating the valve body 42*c* and the seat 44*d* of the gate-out valve 30 similarly to FIG. 11, but illustrate a configuration in which the seat 44*d* is formed only by the conical portion 44*d*1. FIG. 12(*a*) illustrates the valve body 42*c* and the seat 44*d* with the gate-out valve 30 closed. FIG. 12(*b*) illustrates the valve body 42*c* and the seat 44*d* when the valve-opening amount thereof is proportionally controlled. The seat 44*d* according to the first embodiment includes the conical portion 44*d*1 and the spherical portion 44*d*2, but, even if the seat 44*d* is formed only by the conical portion 44*d*1, the valve body 42*c* is similarly moved while being in contact with the side surface of the seat 44*d* (the conical portion 44*d*1) when the valve body 42*c* is moved in the valve-opening direction with the plunger 42 moved in the radial direction.

The friction between the valve body 42*c* and the seat 44*d* is changed when a force pressing the valve body 42*c* against the seat 44*d* is changed, and when a frictional coefficient between the valve body 42*c* and the seat 44*d* is changed.

The force pressing the valve body 42*c* against the seat 44*d* is changeable in the case where the seat 44*d* includes the conical portion 44*d*1 and the spherical portion 44*d*2 as illustrated in FIG. 11, and is changed when the portion that the valve body 42*c* contacts is switched between the conical portion 44*d*1 and the spherical portion 44*d*2. A direction in which the valve body 42*c* is pressed against the seat 44*d* is different between when the valve body 42*c* is in contact with the conical portion 44*d*1 and when the valve body 42*c* is in contact with the spherical portion 44*d*2, and therefore the force pressing the valve body 42*c* against the seat 44*d* is changed even when the force applied to the plunger 42 or the direction thereof is unchanged. The frictional coefficient between the valve body 42*c* and the seat 44*d* is changed when the valve body 42*c* starts being moved from a state stationary relative to the seat 44*d*. In other words, the frictional coefficient between the valve body 42*c* and the seat 44*d* is changed when the frictional coefficient is changed from a static frictional coefficient to a kinetic frictional coefficient. If the strength of the friction itself between the valve body 42*c* and the seat 44*d* can be reduced, this reduction can also lead to a reduction in a change amount of the change in the friction due to any of the above-described causes.

The reduction in the strength of the friction between the valve body 42c and the seat 44d can be achieved by reducing the force applied to the plunger 42 in the radial direction. Next, the force applied to the plunger 42 in the radial direction will be described.

[Regarding Force Radially Applied to Plunger]

Figure 13:
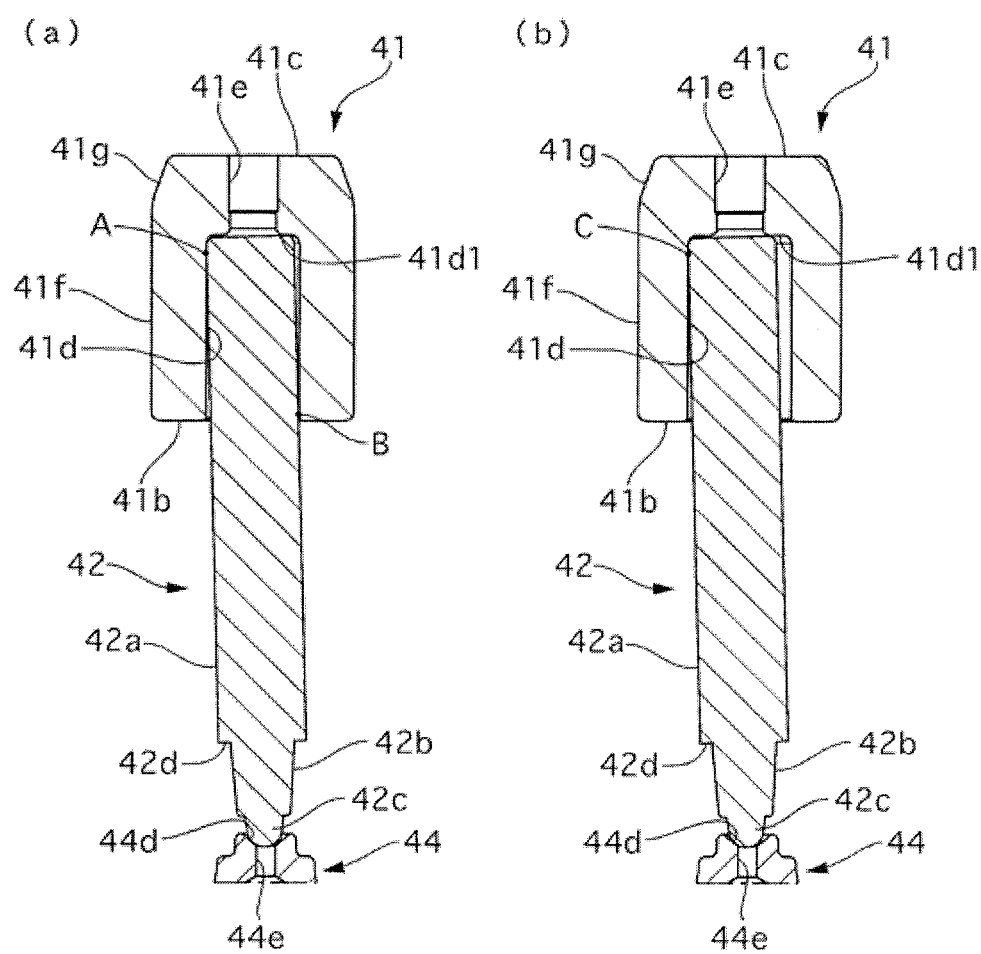
FIG. 13 illustrates how the armature is positioned when being moved in a radial direction according to the first embodiment.

FIG. 13 illustrates how the armature 41 is positioned when being moved in the radial direction (to the left side in FIG. 13). FIG. 13(a) illustrates how the armature 41 is positioned when the minimum radial space CLb between the inner periphery of the restriction portion 41d of the armature 41 and the outer periphery of the main body portion 42a of the plunger 42 is narrower than the maximum radial space CLa between the inner periphery of the armature containing portion 40a of the cylinder 40 and the outer periphery of the main body portion 41f of the armature 41. FIG. 13(b) illustrates how the armature 41 is positioned when the minimum radial space CLb is wider than the maximum radial space CLa.

When the minimum radial space CLb is relatively narrow (FIG. 13(a)), the inner periphery of the restriction portion 41d of the armature 41 and the outer periphery of the main body portion 42a of the plunger 42 are in contact with each other at two portions, i.e. a contact surface A on the negative side in the axial direction and a contact surface B on the positive side in the axial direction. Therefore, the plunger 42 is subjected to a force applied from the armature 41 to the left side in FIG. 13. On the other hand, when the minimum radial space CLb is relatively wide (FIG. 13(b)), the inner periphery of the restriction portion 41d of the armature 41 and the outer periphery of the main body portion 42a of the plunger 42 are in contact with each other at one portion, i.e. a contact surface C on the negative side in the axial direction. Therefore, although the plunger 42 is subjected on the contact surface C to a counteracting force corresponding to the amount of the force by which plunger 42 presses the armature 41, the plunger 42 is not subjected to the force from the armature 41 to the left side in FIG. 13.

In the first embodiment, the gate-out valve 30 is configured in such a manner that the minimum radial space CLb becomes wider than the maximum radial space CLa, thereby reducing the force applied from the armature 41 to the plunger 42 in the radial direction and thus reducing the strength of the friction between the valve body 42c and the seat 44d.

[Regarding Friction Between Plunger and Body]

When the outer peripheral surface of the main body portion 42a of the plunger 42 and the inner peripheral surface of the insertion hole 43d of the body 43 are in contact with each other, friction is generated between the plunger 42 and the body 43. With the friction generated between the plunger 42 and the body 43, the friction is changed when the plunger 42 starts being moved from the stationary state. When the outer peripheral surface of the main body portion 42a of the plunger 42 and the inner peripheral surface of the insertion hole 43d of the body 43 are in contact with each other, excessive friction is generated there because the main body portion 42a of the plunger 42 and the insertion hole 43d of the body 43 each have the shape extending in the axial direction.

Therefore, in the first embodiment, the minimum radial space CLc between the inner periphery of the insertion hole 43d of the body 43 and the outer periphery of the main body portion 42a of the plunger 42 is formed so as to become wider than the minimum radial space CLb between the inner periphery of the restriction portion 41d of the armature 41 and the outer periphery of the main body portion 42a of the plunger 42.

More preferably, the minimum radial space CLc is formed so as to become wider than a sum of the minimum radial space CLb and the maximum radial space CLa between the inner periphery of the armature containing portion 40a of the cylinder 40 and the outer periphery of the main body portion 41f of the armature 41.

Figure 14:
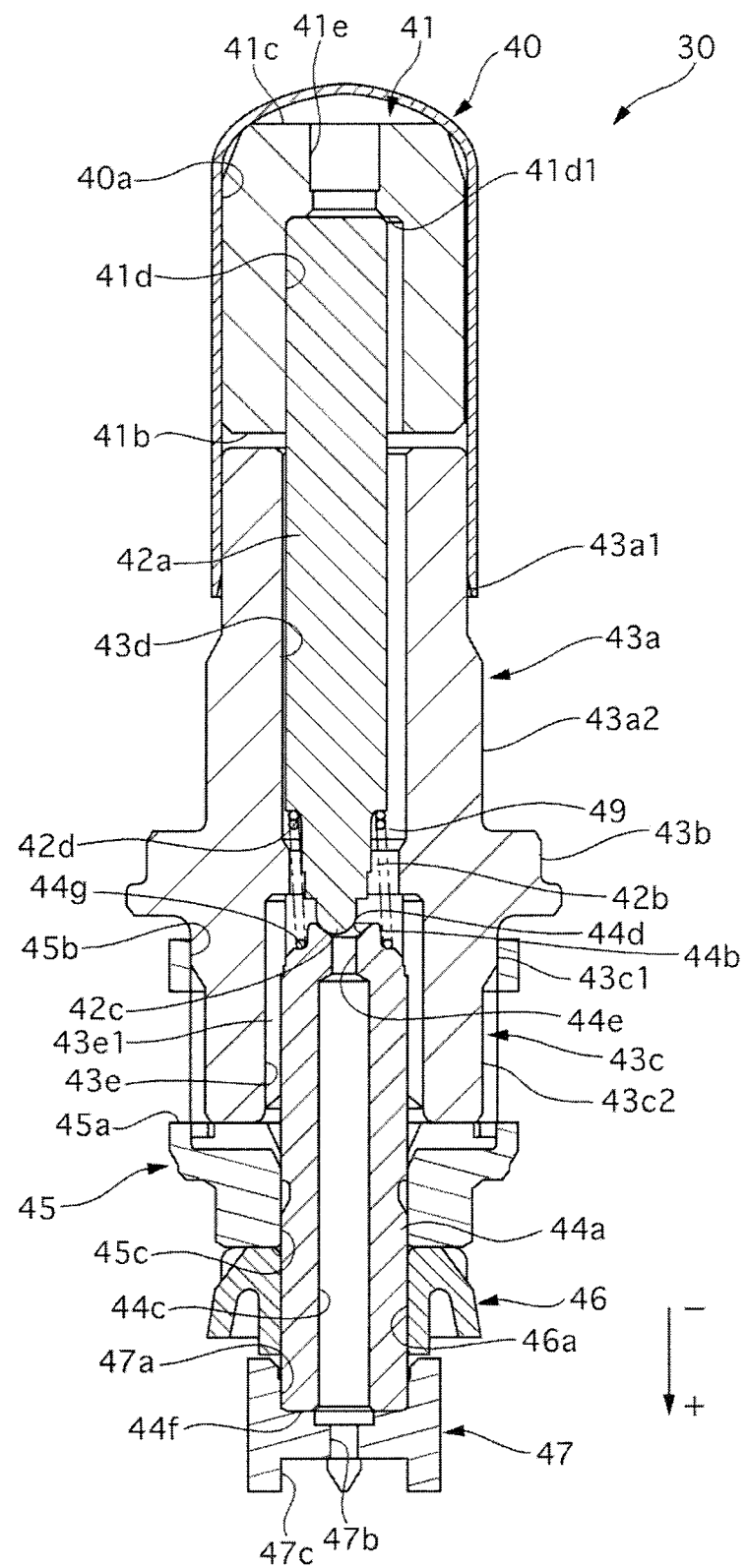
FIG. 14 illustrates the gate-out valve with the plunger maximumly moved in the radial direction relative to a valve axis according to the first embodiment.

FIG. 14 illustrates the gate-out valve 30 with the plunger 42 maximumly moved in the radial direction with respect to the valve axis (the plunger 42 moved to the left side in FIG. 14). The plunger 42 being maximumly moved in the radial direction with respect to the valve axis corresponds to the armature 41 being moved in the radial direction with respect to the valve axis and the outer peripheral surface of the armature 41 being brought into abutment with the inner peripheral surface of the armature containing portion 40a of the cylinder 40, and also corresponds to the plunger 42 being moved in the same direction as the movement direction of the armature 41 and the outer peripheral surface of the plunger 42 being brought into abutment with the inner peripheral surface of the restriction portion 41d of the armature 41.

The gate-out valve 30 is configured in such a manner that the minimum radial space CLc becomes wider than the sum of the maximum radial space CLa and the minimum radial space CLb, thereby succeeding in avoiding a contact between the outer peripheral surface of the plunger 42 and the inner peripheral surface of the insertion hole 43d of the body 43 even when the plunger 42 is maximumly moved in the radial direction with respect to the valve axis as illustrated in FIG. 14. Therefore, the gate-out valve 30 can prevent or reduce the friction that otherwise would be generated between the plunger 42 and the body 43, and also prevent or reduce the change in the friction.

For example, when the hydraulic control unit 2 is installed on the vehicle in the state illustrated in FIGS. 2 to 4 (the state in which the third surface 9c is located to serve as the top surface), the armature 41 and the plunger 42 are supposed to be constantly subjected to a force downward in the direction of gravitational force. At this time, the armature 41 has line contact on a lower side in the direction of gravitational force with respect to the cylinder 40. Managing the space between the cylinder 40 and the armature 41, the space between the armature 41 and the plunger 42, and the space between the body 43 and the plunger 42, like the first embodiment, can make the gate-out valve 30 especially effective in preventing or reducing the friction and preventing or reducing the change in the friction when the hydraulic control unit 2 is installed on the vehicle in the state illustrated in FIGS. 2 to 4.

[Advantageous Effects]

(1) The gate-out valve 30 (an electromagnetic valve) includes the solenoid 48 configured to generate the electromagnetic force by receiving the power supply, the cylinder 40 (a cylindrical member) disposed at the inner periphery of the solenoid 48 and made from the non-magnetic material, the armature 41 (a movable member) including the restriction portion 41d on the one end side in the axial direction (the positive side in the axial direction), configured to be moved in the axial direction on the inner periphery of the cylinder 40 due to the attracting force of the solenoid 48, and made from the magnetic material, the plunger 42 configured to be subjected to the restriction of the movement thereof in the radial direction due to the opposite end portion thereof (the end portion on the negative side in the axial direction) disposed at the restriction portion 41d, the seat member 44 including the seat 44d (a valve seat) on which the one end portion of the plunger 42 in the axial direction (the end portion on the positive side in the axial direction) is seated, and the body 43 including the opposite end portion in the axial direction (the end portion on the negative side in the axial direction) that is fixed to the cylinder 40 and including the insertion hole 43d in which the plunger 42 is inserted. When CLa represents the movable amount of the armature 41 in the radial direction on the inner peripheral side of the cylinder 40, and CLb represents the movable amount of the plunger 42 in the radial direction relative to the restriction portion 41d, the expression CLa<CLb is satisfied.

Therefore, the gate-out valve 30 can reduce the change in the friction between the valve body 42c of the plunger 42 and the seat 44d. Therefore, the gate-out valve 30 can eliminate or reduce the variation in the valve-opening amount of the gate-out valve 30 with respect to the amount of power supply to the coil 48b.

(2) When CLc represents the movable amount of the plunger 42 in the radial direction on the inner peripheral side of the insertion hole, the gate-out valve 30 satisfies the expression CLa<CLb<CLc.

Therefore, the gate-out valve 30 can prevent or reduce the change in the friction between the plunger 42 and the body 43. Therefore, the gate-out valve 30 can eliminate or reduce the variation in the valve-opening amount of the gate-out valve 30 with respect to the amount of power supply to the coil 48b.

(3) The gate-out valve 30 satisfies the expression (CLa+CLb)<CLc.

Therefore, the gate-out valve 30 can avoid the contact between the outer peripheral surface of the plunger 42 and the inner peripheral surface of the insertion hole 43d of the body 43 even when the plunger 42 is maximumly moved in the radial direction with respect to the valve axis. Therefore, the gate-out valve 30 can prevent or reduce the change in the friction between the plunger 42 and the body 43.

(4) The restriction portion 41d is provided as the recessed portion formed on the surface of the armature 41 on the one end side in the axial direction (the positive side in the axial direction), and opened toward the one end side in the axial direction (the positive side in the axial direction).

Therefore, the plunger 42 can be formed into the rod shape extending in the axial direction. Therefore, the plunger 42 can be easily manufactured.

(5) The armature 41 includes, on the outer periphery thereof, the communication groove 41a configured to establish the communication between the one end side and the opposite end side in the axial direction (the positive side and the negative side in the axial direction).

Therefore, the gate-out valve 30 can reduce the contact area between the armature containing portion 40a of the cylinder 40 and the outer peripheral surface of the armature 41, thereby reducing the friction between the cylinder 40 and the armature 41. Further, the gate-out valve 30 can allow the fluid to flow between the first surface 41b and the second surface 41c of the armature 41 due to the communication groove 41a, thereby reducing the fluid resistance when the armature 41 is moved in the axial direction.

(6) The armature 41 includes the communication hole 41e configured to establish the communication between the bottom portion 41d1 of the restriction portion 41d on the opposite end side in the axial direction (the negative side in the axial direction), and the second surface 41c.

Therefore, the gate-out valve 30 can eliminate or reduce a possibility that the plunger 42 and the bottom portion 41d1 of the restriction portion 41d on the opposite end side in the axial direction (the negative side in the axial direction) are stuck to each other due to the communication hole 41e, and, further allow the fluid to flow between inside the restriction portion 41d and the second surface 41c due to the communication hole 41e, thereby reducing the fluid resistance when the armature 41 is moved in the axial direction.

(7) The valve body 42c at the one end portion of the plunger 42 in the axial direction (the end portion on the positive side in the axial direction) that is seated on the seat 44d is spherically formed.

Therefore, the gate-out valve 30 can allow the valve body 42c and the seat 44d to be brought into a line contact or point contact with each other when the gate-out valve 30 is closed, thereby preventing or reducing the friction between the valve body 42c and the seat 44d.

(8) The plunger 42 is made from the resin.

Therefore, the gate-out valve 30 can prevent or reduce wear at the portion in contact with the plunger 42 (for example, the restriction portion 41d of the armature 41). Further, the use of the resin allows the plunger 42 to be manufactured at low cost.

(9) The gate-out valve 30 (an electromagnetic valve) includes the solenoid 48 configured to generate the electromagnetic force by receiving the power supply, the cylinder 40 (a cylindrical member) disposed at the inner periphery of the solenoid 48 and made from the non-magnetic material, the armature 41 (a movable member) including the restriction portion 41d (a recessed portion) formed on the surface on the one end side in the axial direction (the positive side in the axial direction) and opened toward the one end side in the axial direction (the positive side in the axial direction), configured to be moved in the axial direction on the inner periphery of the cylinder 40 due to the attracting force of the solenoid, and made from the magnetic material, the plunger 42 including the opposite end portion in the axial direction (the end portion on the negative side in the axial direction) that is disposed in the recessed portion, the seat member 44 including the seat 44d (a valve seat) on which the one end portion of the plunger 42 in the axial direction (the end potion on the positive side in the axial direction) is seated, and the body 43 including the one end portion in the axial direction (the end portion on the positive side in the axial direction) that is fixed to the cylindrical member and including the insertion hole in which the plunger 42 is inserted. When CLa represents the maximum radial space between the outer periphery of the armature 41 (the movable member) and the inner periphery of the cylindrical member, and CLb represents the minimum radial space between the outer periphery of the plunger 42 and the inner periphery of the recessed portion, the expression CLa<CLb is satisfied.

Therefore, the gate-out valve 30 can reduce the change in the friction between the valve body 42c of the plunger 42 and the seat 44d. Therefore, the gate-out valve 30 can eliminate or reduce the variation in the valve-opening amount of the gate-out valve 30 with respect to the amount of power supply to the coil 48b.

(10) The brake apparatus 1 includes the housing 9 including the fluid passage 13 therein, and the gate-out valve 30 (an electromagnetic valve) provided in the housing 9 and configured to open and close the fluid passage 13 according to the operation state of the brake. The brake apparatus 1 includes the solenoid 48 configured to generate the electromagnetic force by receiving the power supply, the cylinder 40 (a cylindrical member) disposed at the inner periphery of the solenoid 48 and made from the non-magnetic material, the armature 41 (a movable member) including the restriction portion 41*d* on the one end side in the axial direction (the positive side in the axial direction), configured to be moved in the axial direction on the inner periphery of the cylinder 40 due to the attracting force of the solenoid 48, and made from the magnetic material, the plunger 42 configured to be subjected to the restriction of the movement thereof in the radial direction due to the opposite end portion thereof (the end portion on the negative side in the axial direction) disposed at the restriction portion 41*d*, the seat member 44 including the seat 44*d* (a valve seat) on which the one end portion of the plunger 42 in the axial direction (the end portion on the positive side in the axial direction) is seated, and the body 43 including the opposite end portion in the axial direction (the end portion on the negative side in the axial direction) that is fixed to the cylinder 40 and including the insertion hole through which the plunger 42 is inserted. When CLa represents the movable amount of the armature 41 in the radial direction on the inner peripheral side of the cylinder 40, and CLb represents the movable amount of the plunger 42 in the radial direction relative to the restriction portion 41*d*, the expression CLa<CLb is satisfied.

Therefore, the brake apparatus 1 can reduce the change in the friction between the valve body 42*c* of the plunger 42 and the seat 44*d*. Therefore, the brake apparatus 1 can eliminate or reduce the variation in the valve-opening amount of the gate-out valve 30 with respect to the amount of power supply to the coil 48*b*.

(11) The armature 41 is placed in the state having line contact on the lower side in the direction of gravitational force with respect to the cylinder 40.

Therefore, in such a state that the armature 41 or the plunger 42 is moved relative to the cylinder 40 or the body 43 due to its own weight, the brake apparatus 1 can effectively reduce the change in the friction between the valve body 42*c* of the plunger 42 and the seat 44*d*. Therefore, the brake apparatus 1 can eliminate or reduce the variation in the valve-opening amount of the gate-out valve 30 with respect to the amount of power supply to the coil 48*b*.

Second Embodiment

Figure 15:
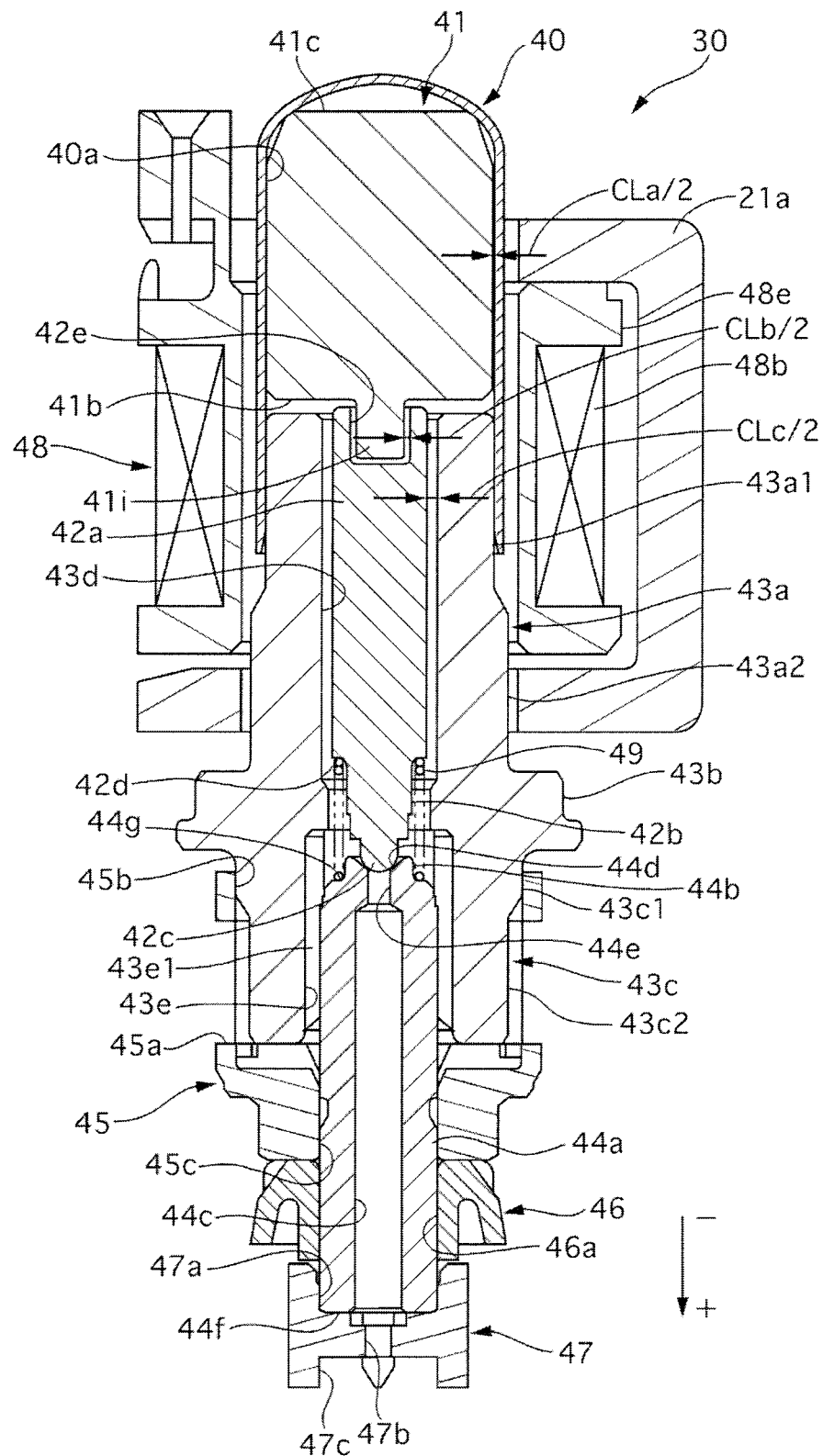
FIG. 15 is an axial cross-sectional view of a gate-out valve according to a second embodiment.

FIG. 15 is an axial cross-sectional view of the gate-out valve 30.

In the first embodiment, the restriction portion 41*d* is formed as the recessed portion opened on the first surface 41*b* of the armature 41. On the other hand, in a second embodiment, the gate-out valve 30 is configured to include a restriction portion 41*i* formed so as to protrude from the first surface 41*b* of the armature 41 to the positive side in the axial direction. The restriction portion 41*i* is formed generally cylindrically. Further, the surface of the plunger 42 on the negative side in the axial direction is pierced to form a recessed portion 42*e* having a larger inner diameter than an outer diameter of the restriction portion 41*i*. The movement amount by which the plunger 42 is moved in the radial direction relative to the armature 41 is restricted by insertion of the restriction portion 41*i* of the armature 41 in the recessed portion 42*e*.

[Advantageous Effects]

(12) The restriction portion 41*i* is provided as the protruding portion formed on the surface of the armature 41 (the movable member) on the one end side in the axial direction (the positive side in the axial direction), and protruding toward the one end side in the axial direction (the positive side in the axial direction).

Therefore, the gate-out valve 30 can also include the restriction portion 41*i* formed as the protruding portion by including the recessed portion 42*e* formed on the surface of the plunger 42 on the negative side in the axial direction.

Third Embodiment

Figure 16:
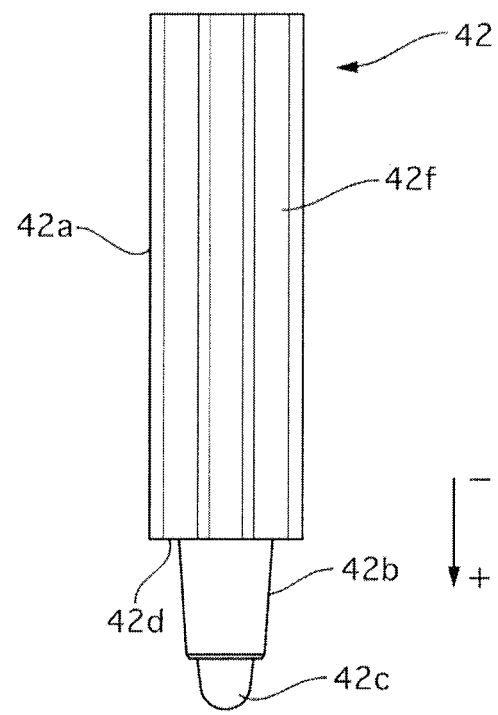
FIG. 16 illustrates an outer appearance of a plunger according to a third embodiment.
Figure 16:
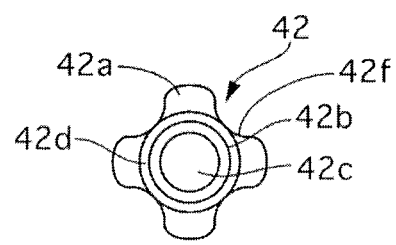

FIG. 16 illustrates an outer appearance of the plunger 42. FIG. 16(*a*) illustrates the plunger 42 as viewed from the radial direction. FIG. 16(*b*) illustrates the plunger 42 as viewed from the negative side in the axial direction.

In the first embodiment, the main body portion 42*a* of the plunger 42 is formed cylindrically. In a third embodiment, communication grooves 42*f*, which establish communication between the positive side in the axial direction and the negative side in the axial direction, are formed on the outer periphery of the main body portion 42*a*. Four communication grooves 42*f* are provided on the outer peripheral surface of the main body portion 42*a* at even intervals.

[Advantageous Effects]

(13) The plunger 42 includes, on the outer periphery thereof, the communication groove 42*f* configured to establish the communication between the one end side and the opposite end side in the axial direction (the positive side and the negative side in the axial direction).

Therefore, the gate-out valve 30 can allow the fluid to flow between the positive side and the negative side of the plunger 42 in the axial direction due to the communication hole 42*f*, thereby reducing the fluid resistance when the plunger 42 is moved in the axial direction.

Fourth Embodiment

In the first embodiment, the three communication grooves 41*a* are formed on the outer peripheral surface of the armature 41. In the second embodiment, the gate-out valve 30 is configured to include three communication holes 41*h* formed inside the armature 41.

Figure 17:
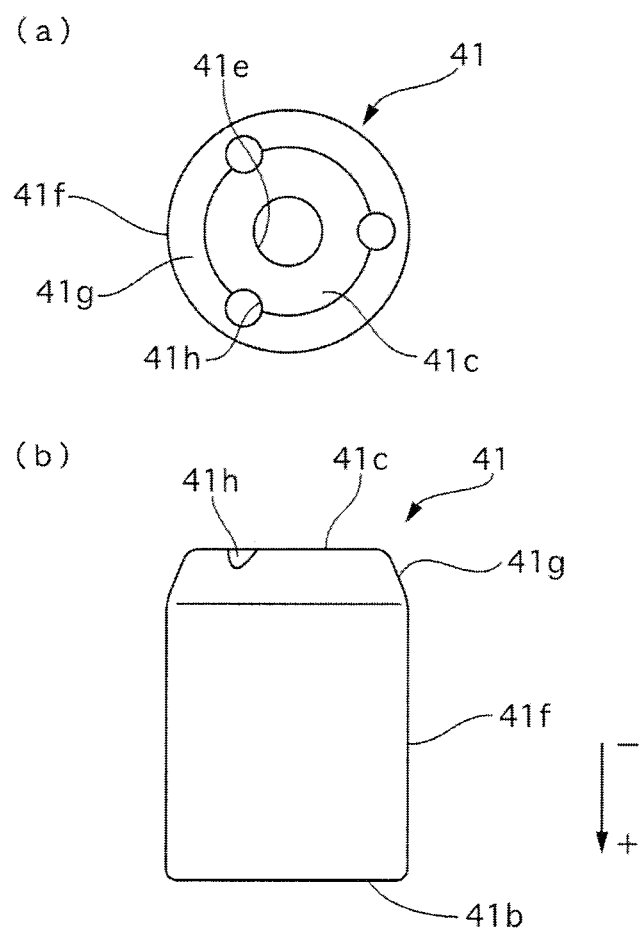
FIG. 17 illustrates an outer appearance of an armature according to a fourth embodiment.
Figure 18:
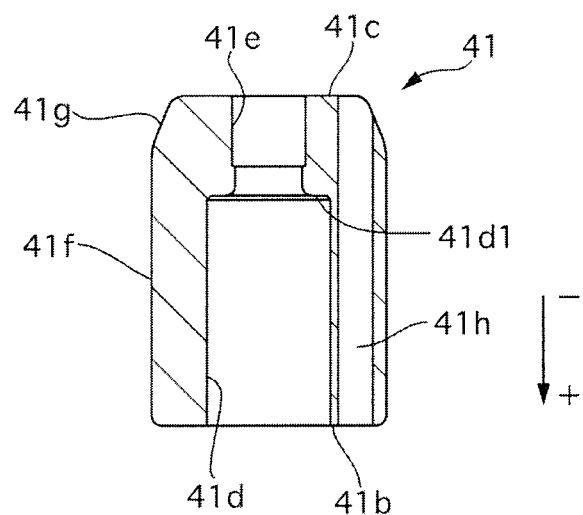
FIG. 18 is an axial cross-sectional view of the armature according to the fourth embodiment.

FIG. 17 illustrates an outer appearance of the armature 41. FIG. 17(*a*) illustrates the armature 41 as viewed from the negative side in the axial direction. FIG. 17(*a*) illustrates the armature 41 as viewed from the radial direction. FIG. 18(*a*) is an axial cross-sectional view of the armature 41.

In the fourth embodiment, the three communication holes 41*h* are formed inside the armature 41 and on an outer peripheral side with respect to the restriction portion 41*d*. The communication holes 41*h* are formed at approximately equal distances in the circumferential direction of the armature 41 when the armature 41 is viewed from the axial direction. The communication holes 41*h* are formed from the first surface 41*b*, which is the surface of the armature 41 on the positive side in the axial direction, to the second surface 41*c*, which is the surface of the armature 41 on the negative side in the axial direction.

[Advantageous Effects]

(14) The armature 41 includes therein the communication groove 41*h* configured to establish the communication between the one end side and the opposite end side in the axial direction (the positive side and the negative side in the axial direction).

Therefore, the gate-out valve 30 can allow the fluid to flow between the first surface 41*b* and the second surface 41*c* of the armature 41 due to the communication hole 41*h*, thereby reducing the fluid resistance when the armature 41 is moved in the axial direction.

Other Embodiments

Having described the present invention based on the first to fourth embodiments thereof, the specific configuration of each invention is not limited to the first to fourth embodiments, and the present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

The first to fourth embodiments have been described referring to the gate-out valve 30, but may also be applied to another normally-opened electromagnetic valve such as the pressure increase valves 32.

In the following description, technical ideas recognizable from the above-described embodiments will be described.

An electromagnetic valve, according to one aspect thereof, includes a solenoid configured to generate an electromagnetic force by receiving power supply, a cylindrical member disposed at an inner periphery of the solenoid and made from a non-magnetic material, a movable member including a restriction portion on one end side in an axial direction, configured to be moved in the axial direction on an inner periphery of the cylindrical member due to an attracting force of the solenoid, and made from a magnetic material, a plunger configured to be subjected to restriction of a movement thereof in a radial direction due to an opposite end portion thereof disposed at the restriction portion, a seat member including a valve seat on which one end portion of the plunger in the axial direction is seated, and a body including an opposite end portion in the axial direction that is fixed to the cylindrical member and including an insertion hole in which the plunger is inserted. When $CL_a$ represents a movable amount of the movable member in the radial direction on the inner peripheral side of the cylindrical member, and $CL_b$ represents a movable amount of the plunger in the radial direction relative to the restriction portion, an expression $CL_a < CL_b$ is satisfied.

Therefore, the electromagnetic valve can reduce a change in friction between the one end portion of the plunger in the axial direction and the valve seat. Therefore, the electromagnetic valve can eliminate or reduce a variation in a valve-opening amount of the electromagnetic valve with respect to an amount of power supply to the solenoid.

According to a more preferable aspect, in the above-described aspect, when $CL_c$ represents a movable amount of the plunger in the radial direction on an inner peripheral side of the insertion hole, the electromagnetic valve satisfies an expression $CL_a < CL_b < CL_c$.

Therefore, the electromagnetic valve can reduce a change in friction between the plunger and the body. Therefore, the electromagnetic valve can eliminate or reduce the variation in the valve-opening amount of the electromagnetic valve with respect to the amount of power supply to the solenoid.

According to a further different preferable aspect, in any of the above-described aspects, the electromagnetic valve satisfies an expression $(CL_a + CL_b) < CL_c$.

Therefore, the electromagnetic valve can avoid a contact between the outer peripheral surface of the plunger and the inner peripheral surface of the insertion hole of the body even when the plunger is maximumly moved in the radial direction with respect to the valve axis. Therefore, the electromagnetic valve can prevent or reduce the change in the friction between the plunger and the body.

According to a further different preferable aspect, in any of the above-described aspects, the restriction portion is a recessed portion formed on a surface of the movable member on the one end side in the axial direction, and opened toward the one end side in the axial direction.

Therefore, the plunger can be formed into a rod shape extending in the axial direction. Therefore, the plunger can be easily manufactured.

According to a further different preferable aspect, in any of the above-described aspects, the movable member includes, on an outer periphery thereof, a communication groove configured to establish communication between one end portion and an opposite end portion in the axial direction.

Therefore, the electromagnetic valve can reduce a contact area between the cylindrical member and the outer peripheral surface of the movable member, thereby reducing friction between the cylindrical member and the movable member. Further, the electromagnetic valve can allow the fluid to flow between the one end portion and the opposite end portion of the movable member in the axial direction due to the communication groove, thereby reducing fluid resistance when the movable member is moved in the axial direction.

According to a further different preferable aspect, in any of the above-described aspects, the movable member includes a communication hole configured to establish communication between a bottom portion of the recessed portion on the opposite end side in the axial direction, and a surface of the movable member on the opposite end side in the axial direction.

Therefore, the electromagnetic valve can eliminate or reduce a possibility that the plunger and the bottom portion of the restriction portion on the opposite end side in the axial direction are stuck to each other due to the communication hole, and, further allow the fluid to flow between inside the restriction portion and the opposite end side of the movable member in the axial direction due to the communication hole, thereby reducing the fluid resistance when the movable member is moved in the axial direction.

According to a further different preferable aspect, in any of the above-described aspects, a portion of the one end portion of the plunger in the axial direction that is seated on the valve seat is spherical.

Therefore, the electromagnetic valve can allow the one end portion of the plunger in the axial direction and the valve seat to be brought into a line contact or point contact with each other when the electromagnetic valve is closed, thereby preventing or reducing the friction between the one end portion of the plunger in the axial direction and the valve seat.

According to a further different preferable aspect, in any of the above-described aspects, the restriction portion is a protruding portion formed on a surface of the movable member on the one end side in the axial direction, and protruding toward the one end side in the axial direction.

Therefore, the electromagnetic valve can also include the restriction portion formed as the protruding portion by including a recessed portion formed on the surface of the plunger on the one end side in the axial direction.

According to a further different preferable aspect, in any of the above-described aspects, the plunger is made from resin.

Therefore, the electromagnetic valve can prevent or reduce wear at a portion in contact with the plunger. Further, the use of the resin allows the plunger to be manufactured at low cost.

According to a further different preferable aspect, in any of the above-described aspects, the plunger includes, on an outer periphery thereof, a communication groove configured to establish communication between the one end portion and the opposite end portion in the axial direction.

Therefore, the electromagnetic valve can allow the fluid to flow between the positive side and the negative side of the plunger in the axial direction due to the communication hole, thereby reducing fluid resistance when the plunger is moved in the axial direction.

Further, from another view point, an electromagnetic valve includes a solenoid configured to generate an electromagnetic force by receiving power supply, a cylindrical member disposed at an inner periphery of the solenoid and made from a non-magnetic material, a movable member including a recessed portion formed on a surface on one end side in an axial direction and opened toward the one end side in the axial direction, configured to be moved in the axial direction on the inner periphery of the cylindrical member due to an attracting force of the solenoid, and made from a magnetic material, a plunger including an opposite end portion in the axial direction that is disposed in the recessed portion, a seat member including a valve seat on which one end portion of the plunger in the axial direction is seated, and a body including one end portion in the axial direction that is fixed to the cylindrical member and including an insertion hole in which the plunger is inserted. When CLa represents a maximum radial space between an outer periphery of the movable member and an inner periphery of the cylindrical member, and CLb represents a minimum radial space between an outer periphery of the plunger and an inner periphery of the recessed portion, an expression CLa<CLb is satisfied.

Therefore, the electromagnetic valve can reduce a change in friction between the one end portion of the plunger in the axial direction and the valve seat. Therefore, the electromagnetic valve can eliminate or reduce a variation in a valve-opening amount of the electromagnetic valve with respect to an amount of power supply to the solenoid.

According to a more preferable aspect, in the above-described aspect, when CLc represents a minimum radial space between an outer periphery of the plunger and an inner periphery of the insertion hole, the electromagnetic valve satisfies an expression CLa<CLb<CLc.

Therefore, the electromagnetic valve can reduce a change in friction between the plunger and the body. Therefore, the electromagnetic valve can eliminate or reduce the variation in the valve-opening amount of the electromagnetic valve with respect to the amount of power supply to the solenoid.

According to a further different preferable aspect, in any of the above-described aspects, the electromagnetic valve satisfies an expression (CLa+CLb)<CLc.

Therefore, the electromagnetic valve can avoid a contact between the outer peripheral surface of the plunger and the inner peripheral surface of the insertion hole of the body even when the plunger is maximumly moved in the radial direction with respect to the valve axis. Therefore, the electromagnetic valve can prevent or reduce the change in the friction between the plunger and the body.

According to a further different preferable aspect, in any of the above-described aspects, the plunger is made from resin.

Therefore, the electromagnetic valve can prevent or reduce wear at a portion in contact with the plunger. Further, the use of the resin allows the plunger to be manufactured at low cost.

Further, from another view point, a brake apparatus includes a housing including a fluid passage therein, and an electromagnetic valve provided in the housing and configured to open and close the fluid passage according to an operation state of a brake. The brake apparatus includes a solenoid configured to generate an electromagnetic force by receiving power supply, a cylindrical member disposed at an inner periphery of the solenoid and made from a non-magnetic material, a movable member including a restriction portion on one end side in an axial direction, configured to be moved in the axial direction on an inner periphery of the cylindrical member due to an attracting force of the solenoid, and made from a magnetic material, a plunger configured to be subjected to restriction of a movement thereof in a radial direction due to one end portion thereof disposed at the restriction portion, a seat member including a valve seat on which one end portion of the plunger in the axial direction is seated, and a body including an opposite end portion in the axial direction that is fixed to the cylindrical member and including an insertion hole in which the plunger is inserted. When CLa represents a movable amount of the movable member in the radial direction on the inner peripheral side of the cylindrical member, and CLb represents a movable amount of the plunger in the radial direction relative to the restriction portion, an expression CLa<CLb is satisfied.

Therefore, the brake apparatus can reduce a change in friction between the one end portion of the plunger in the axial direction and the valve seat. Therefore, the brake apparatus can eliminate or reduce a variation in a valve-opening amount of the electromagnetic valve with respect to an amount of power supply to the solenoid.

According to a more preferable aspect, in the above-described aspect, when CLc represents a movable amount of the plunger in the radial direction on an inner peripheral side of the insertion hole, the electromagnetic valve satisfies an expression CLa<CLb<CLc.

Therefore, the brake apparatus can reduce a change in friction between the plunger and the body. Therefore, the brake apparatus can eliminate or reduce the variation in the valve-opening amount of the electromagnetic valve with respect to the amount of power supply to the solenoid.

According to a further different preferable aspect, in any of the above-described aspects, the electromagnetic valve satisfies an expression (CLa+CLb)<CLc.

Therefore, the brake apparatus can avoid a contact between the outer peripheral surface of the plunger and the inner peripheral surface of the insertion hole of the body even when the plunger is maximumly moved in the radial direction with respect to the valve axis. Therefore, the brake apparatus can prevent or reduce the change in the friction between the plunger and the body.

According to a further different preferable aspect, in any of the above-described aspects, the restriction portion is a recessed portion formed on a surface of the movable member on the one end side in the axial direction, and opened toward the one end side in the axial direction.

Therefore, the plunger can be formed into a rod shape extending in the axial direction. Therefore, the plunger can be easily manufactured.

According to a further different preferable aspect, in any of the above-described aspects, the movable member is placed in a state having line contact on a lower side in a direction of gravitational force with respect to the cylindrical member.

Therefore, in such a state that the movable member or the plunger is moved relative to the cylindrical member or the body due to its own weight, the brake apparatus can effectively reduce the change in the friction between the one end portion of the plunger in the axial direction and the valve seat. Therefore, the brake apparatus can eliminate or reduce the variation in the valve-opening amount of the electromagnetic valve with respect to the amount of power supply to the solenoid.

According to a further different preferable aspect, in any of the above-described aspects, the plunger is made from resin.

Therefore, the brake apparatus can prevent or reduce wear at a portion in contact with the plunger. Further, the use of the resin allows the plunger to be manufactured at low cost.

The present application claims priority to Japanese Patent Application No. 2016-54684 filed on Mar. 18, 2016. The entire disclosure of Japanese Patent Application No. 2016-54684 filed on Mar. 18, 2016 including the specification, the claims, the drawings, and the abstract is incorporated herein by reference in its entirety.

REFERENCE SIGN LIST 30 gate-out valve (electromagnetic valve)
40 cylinder (cylindrical member)
41 armature (movable member)
41a communication groove
41c second surface
41d restriction portion
41d1 bottom portion
42 plunger
42c valve body
43 body
43d insertion hole
44 seat member
44d seat (valve seat)
48 solenoid

The invention claimed is:
1. An electromagnetic valve comprising:
a solenoid configured to generate an electromagnetic force by receiving power supply;
a cylindrical member at least partially disposed in the solenoid and made from a non-magnetic material;
a movable member configured to be moved in the cylindrical member in an axial direction of the electromagnetic valve due to an attracting force of the solenoid, the movable member being made from a magnetic material, the movable member including a restriction portion on one end side of the movable member in the axial direction;
a plunger including one end portion located on the one end side in the axial direction and an opposite end portion located on an opposite end side of the movable member in the axial direction, the plunger being configured to be subjected to restriction of a movement thereof in a radial direction due to the opposite end portion disposed at the restriction portion;
a seat member including a valve seat on which the one end portion of the plunger is seated; and
a body including an insertion hole in which the plunger is inserted, the body including an opposite end portion on the opposite end side of the body in the axial direction, the opposite end portion of the body being fixed to the cylindrical member,
wherein when $CLa$ represents a movable amount of the movable member in the radial direction in the cylindrical member, and $CLb$ represents a movable amount of the plunger in the radial direction relative to the restriction portion, an expression $CLa < CLb$ is satisfied.

2. The electromagnetic valve according to claim 1, wherein when $CLc$ represents a movable amount of the plunger in the radial direction in the insertion hole, an expression $CLa < CLb < CLc$ is satisfied.

3. The electromagnetic valve according to claim 2, wherein an expression $(CLa+CLb) < CLc$ is satisfied.

4. The electromagnetic valve according to claim 3, wherein the restriction portion is a recessed portion formed on a surface of the movable member that is located on the one end side in the axial direction, the recessed portion being opened toward the one end side in the axial direction.

5. The electromagnetic valve according to claim 4, wherein the movable member includes
one end portion located on the one end side in the axial direction,
an opposite end portion located on the opposite end side in the axial direction, and
a communication groove formed on an outer peripheral surface of the movable member and configured to establish communication between the one end portion of the movable member and the opposite end portion of the movable member.

6. The electromagnetic valve according to claim 5, wherein the movable member includes a communication hole configured to establish communication between a bottom portion of the restriction portion that is located on the opposite end side in the axial direction, and a surface of the movable member that is located on the opposite end side in the axial direction.

7. The electromagnetic valve according to claim 6, wherein a portion of the one end portion of the plunger that is seated on the valve seat is spherical.

8. The electromagnetic valve according to claim 3, wherein the restriction portion is a protruding portion formed on a surface of the movable member that is located on the one end side in the axial direction, the protruding portion protruding toward the one end side in the axial direction.

9. The electromagnetic valve according to claim 1, wherein the plunger is made from resin.

10. The electromagnetic valve according to claim 1, wherein the plunger includes a communication groove formed on an outer peripheral surface of the plunger, and configured to establish communication between the one end portion of the plunger and the opposite end portion of the plunger.

11. An electromagnetic valve comprising:
a solenoid configured to generate an electromagnetic force by receiving power supply;
a cylindrical member at least partially disposed in the solenoid and made from a non-magnetic material;
a movable member including a surface located on one end side in an axial direction of the electromagnetic valve and a recessed portion formed on the surface and opened toward the one end side in the axial direction, the movable member being configured to be moved in the cylindrical member in the axial direction due to an attracting force of the solenoid, the movable member being made from a magnetic material;

a plunger including one end portion located on the one end side in the axial direction and an opposite end portion located on an opposite end side of the movable member in the axial direction, the opposite end portion being disposed in the recessed portion;

a seat member including a valve seat on which the one end portion of the plunger is seated; and a body including an insertion hole in which the plunger is inserted, the body including an opposite end portion on the opposite end side of the body in the axial direction, the opposite end portion of the body being fixed to the cylindrical member, wherein when CLa represents a maximum radial space between an outer peripheral surface of the movable member and an inner peripheral surface of the cylindrical member, and CLb represents a minimum radial space between an outer peripheral surface of the plunger and an inner peripheral surface of the movable member forming the recessed portion, an expression CLa <CLb is satisfied.

12. The electromagnetic valve according to claim 11, wherein when CLc represents a minimum radial space between the outer peripheral surface of the plunger and an inner peripheral surface of the body forming the insertion hole, an expression CLa <CLb <CLc is satisfied.

13. The electromagnetic valve according to claim 12, wherein an expression (CLa+CLb)<CLc is satisfied.

14. The electromagnetic valve according to claim 13, wherein the plunger is made from resin.

15. A brake apparatus comprising:

a housing including a fluid passage therein; and an electromagnetic valve provided in the housing and configured to open and close the fluid passage according to an operation state of a brake, the electromagnetic valve including a solenoid configured to generate an electromagnetic force by receiving power supply, a cylindrical member at least partially disposed in the solenoid and made from a non-magnetic material, a movable member configured to be moved in the cylindrical member in an axial direction of the electromagnetic valve due to an attracting force of the solenoid, the movable member being made from a magnetic material, the movable member including a restriction portion on one end side of the movable member in the axial direction, a plunger including one end portion located on the one end side in the axial direction and an opposite end portion located on an opposite end side of the movable member in the axial direction, the plunger being configured to be subjected to restriction of a movement thereof in a radial direction due to the opposite end portion disposed at the restriction portion, a seat member including a valve seat on which the one end portion of the plunger is seated, and a body including an insertion hole in which the plunger is inserted, the body including an opposite end portion on the opposite end side of the body in the axial direction, the opposite end portion of the body being fixed to the cylindrical member, wherein when CLa represents a movable amount of the movable member in the radial direction in the cylindrical member, and CLb represents a movable amount of the plunger in the radial direction relative to the restriction portion, an expression CLa <CLb is satisfied.

16. The brake apparatus according to claim 15, wherein when CLc represents a movable amount of the plunger in the radial direction in the insertion hole, an expression CLa <CLb <CLc is satisfied.

17. The brake apparatus according to claim 16, wherein an expression (CLa+CLb)<CLc is satisfied.

18. The brake apparatus according to claim 17, wherein the restriction portion is a recessed portion formed on a surface of the movable member that is located on the one end side in the axial direction, the recessed portion being opened toward the one end side in the axial direction.

19. The brake apparatus according to claim 15, wherein the movable member has line contact on a lower side in a direction of gravitational force with respect to the cylindrical member.

20. The brake apparatus according to claim 15, wherein the plunger is made from resin.

* * * * *